US012748516B2

(12) United States Patent
Kim et al.

(10) Patent No.: US 12,748,516 B2
(45) Date of Patent: Sep. 29, 2026

(54) DISPLAY DEVICE AND ELECTRONIC DEVICE

(71) Applicant: Samsung Display Co., Ltd., Yongin-si (KR)

(72) Inventors: Kicheol Kim, Yongin-si (KR); Wonkyu Kwak, Yongin-si (KR); Wonjun Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/078,609

(22) Filed: Mar. 13, 2025

(65) Prior Publication Data

US 2025/0348176 A1 Nov. 13, 2025

(30) Foreign Application Priority Data

May 8, 2024 (KR) ........................ 10-2024-0060434

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 2203/04112* (2013.01)

(58) Field of Classification Search
None
See application file for complete search history.

(56) References Cited

U.S. PATENT DOCUMENTS

| | | | |
|---|---|---|---|
| 9,733,776 | B2 | 8/2017 | Han et al. |
| 10,908,754 | B2 | 2/2021 | Bang et al. |
| 11,442,588 | B2 | 9/2022 | Hwang et al. |
| 11,847,272 | B2 | 12/2023 | Lee et al. |

(Continued)

FOREIGN PATENT DOCUMENTS

| | | | |
|---|---|---|---|
| KR | 10-2020-0033362 | A | 3/2020 |
| KR | 10-2376977 | B1 | 3/2022 |

(Continued)

OTHER PUBLICATIONS

International Search Report and Written Opinion of the International Searching Authority, mailed Jun. 23, 2025, corresponding to PCT/KR2025/003892, 8 pages.

*Primary Examiner* — Carl Adams
(74) *Attorney, Agent, or Firm* — Womble Bond Dickinson (US) LLP

(57) ABSTRACT

A display device includes: a display panel; and an input sensing layer on the display panel. The input sensing layer includes: a plurality of sensing electrodes; and a plurality of dummy electrodes on a layer different from the plurality of sensing electrodes and overlapping the plurality of sensing electrodes. The plurality of sensing electrodes includes: a first sensing electrode; and a second sensing electrode adjacent to the first sensing electrode, electrically separated from the first sensing electrode, and having a smaller extent than that of the first sensing electrode. The plurality of dummy electrodes includes: a first dummy electrode overlapping the first sensing electrode; and a second dummy electrode overlapping the second sensing electrode, and the first and second dummy electrodes are connected at a boundary area between the first and second sensing electrodes.

14 Claims, 22 Drawing Sheets

(56) References Cited

U.S. PATENT DOCUMENTS

| | | | | |
|---|---|---|---|---|
| 2016/0132153 | A1* | 5/2016 | Lin | G06F 3/0446 345/174 |
| 2018/0300007 | A1* | 10/2018 | Xu | G06F 3/0445 |
| 2019/0179451 | A1* | 6/2019 | Kim | G06F 3/044 |
| 2022/0317806 | A1* | 10/2022 | Fan | G06F 3/0446 |
| 2023/0036586 | A1 | 2/2023 | Jeon et al. | |
| 2023/0147415 | A1 | 5/2023 | Li et al. | |

FOREIGN PATENT DOCUMENTS

| | | | |
|---|---|---|---|
| KR | 10-2022-0073302 | A | 6/2022 |
| KR | 10-2491224 | B1 | 1/2023 |
| KR | 10-2023-0020045 | A | 2/2023 |
| KR | 10-2023-0055325 | A | 4/2023 |

* cited by examiner

< Charging Section >

< Discharging Section >

DISPLAY DEVICE AND ELECTRONIC DEVICE

CROSS-REFERENCE TO RELATED APPLICATION

The present application claims priority to and the benefit of Korean Patent Application No. 10-2024-0060434, filed on May 8, 2024, in the Korean Intellectual Property Office, the entire disclosure of which is incorporated herein by reference.

BACKGROUND

1. Field

Aspects of embodiments of the present disclosure relate to a display device and an electronic device.

2. Description of the Related Art

Multimedia electronic devices, such as televisions, mobile phones, tablet computers, navigation systems, game consoles, and the like, have display devices for displaying images. In addition, display devices are also provided in vehicle interiors.

In addition to typical input methods, such as buttons, keyboards, and mice, display devices may include an input sensing layer that provides a touch-based input method that allows users to easily, intuitively, and conveniently input information or commands.

SUMMARY

Embodiments of the present disclosure provide a display device having uniform sensing performance over an entire area and an electronic device including the same.

A display device, according to an embodiment of the present disclosure, includes a display panel and an input sensing layer on the display panel. The input sensing layer includes a plurality of sensing electrodes and a plurality of dummy electrodes on a layer different from the plurality of sensing electrodes and overlapping the plurality of sensing electrodes.

The plurality of sensing electrodes include a first sensing electrode and a second sensing electrode that is adjacent to the first sensing electrode, electrically separated from the first sensing electrode, and has a smaller extent than that of the first sensing electrode. The plurality of dummy electrodes includes a first dummy electrode overlapping the first sensing electrode and a second dummy electrode overlapping the second sensing electrode.

The first and second dummy electrodes are connected at a boundary area between the first and second sensing electrodes.

A display device, according to an embodiment of the present disclosure, includes a display panel and an input sensing layer on the display panel, and the input sensing layer includes a plurality of sensing electrodes.

The plurality of sensing electrodes includes a first sensing electrode, a second sensing electrode adjacent to the first sensing electrode, electrically separated from the first sensing electrode, and having an extent that is smaller than that of the first sensing electrode, and a third sensing electrode adjacent to the first sensing electrode, electrically separated from the first and second sensing electrodes, and having an extent equal to that of the first sensing electrode.

The first and third sensing electrodes are spaced apart from each other by a first distance in a boundary area between the first and third sensing electrodes, and the first and second sensing electrodes are spaced apart from each other by a second distance that is smaller than the first distance in the boundary area between the first and second sensing electrodes.

BRIEF DESCRIPTION OF THE DRAWINGS

The above and other aspects and features of the present disclosure will become apparent by describing, in detail, embodiments thereof with reference to the accompanying drawings.

DETAILED DESCRIPTION

Figure 1A:
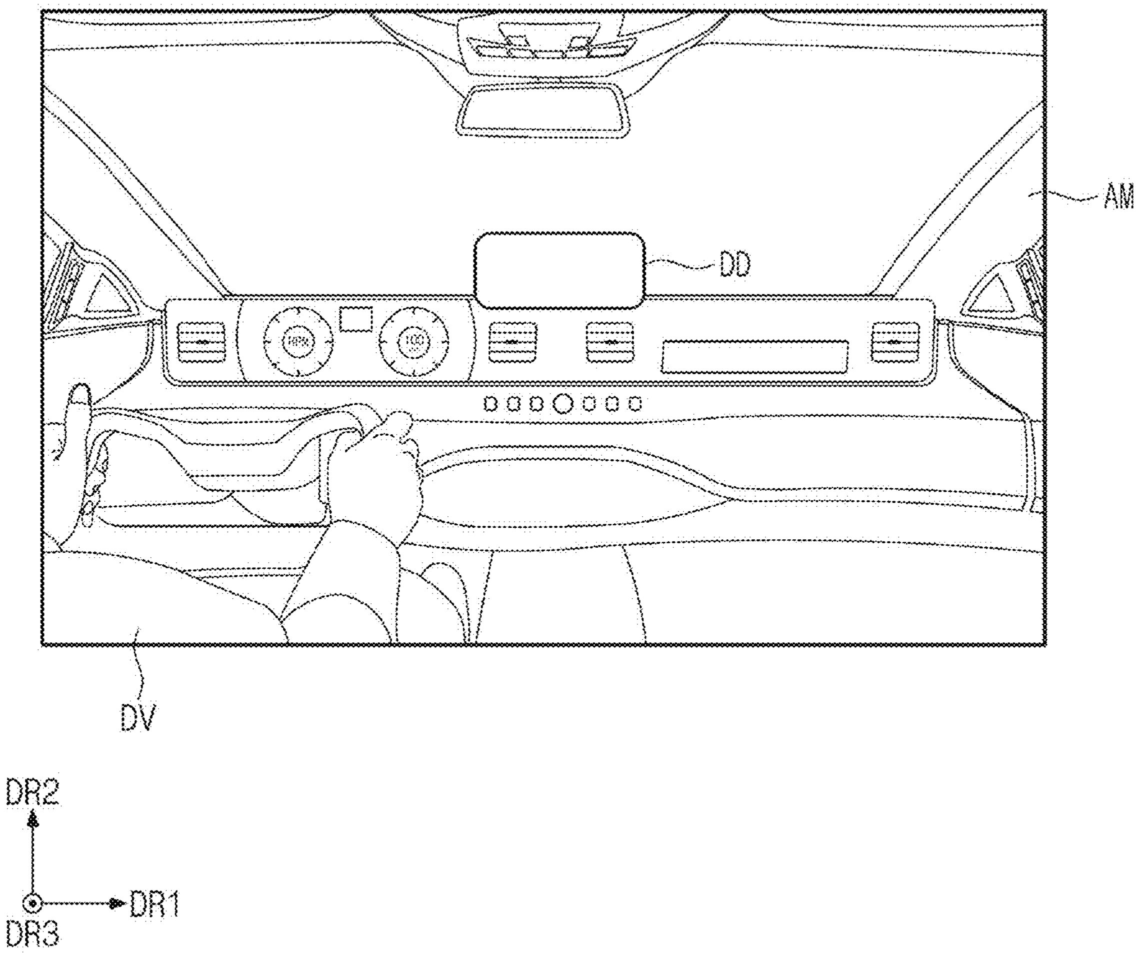
FIG. 1A is a view of an interior of a vehicle including a display device according to an embodiment of the present disclosure.

It will be understood that when an element or layer is referred to as being “on,” “connected to,” or “coupled to”

another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Unless otherwise defined, all terms, including technical and scientific terms, used herein have the same meaning as commonly understood by those skilled in the art to which the present disclosure pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, embodiments of the present disclosure will be described with reference to the accompanying drawings.

Figure 1B:
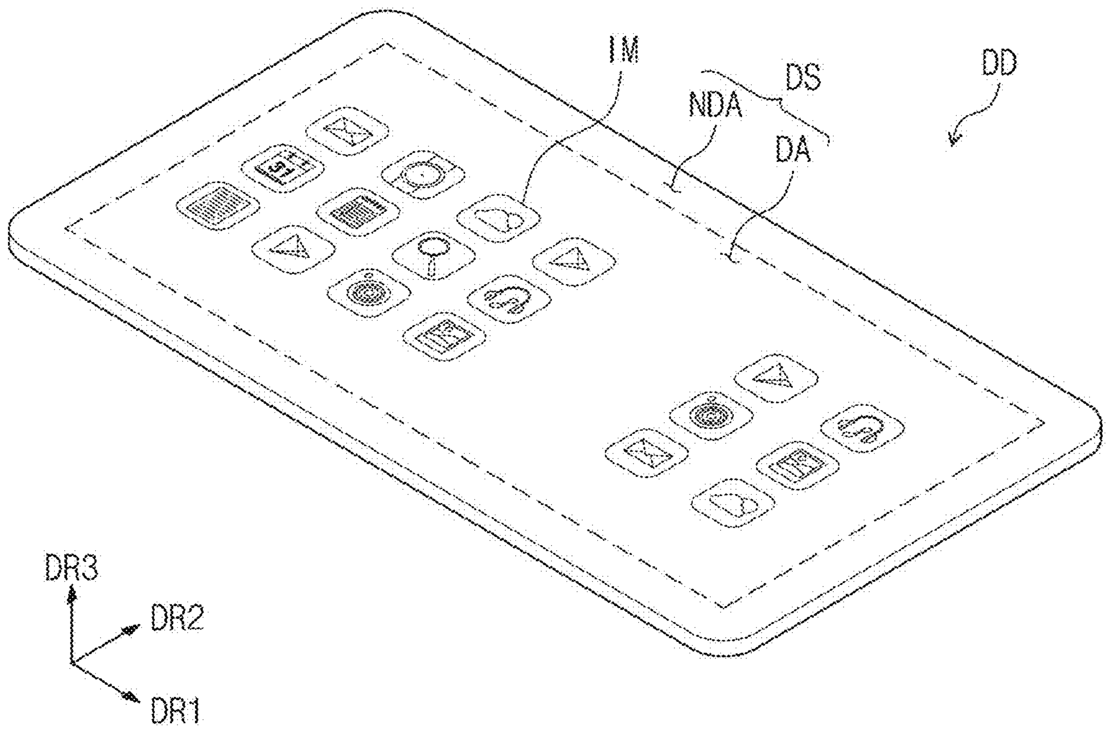
FIG. 1B is a perspective view of the display device illustrated in FIG. 1A.

FIG. 1A is a view of a vehicle interior including a display device according to an embodiment of the present disclosure. FIG. 1B is a perspective view of the display device illustrated in FIG. 1A.

Referring to FIG. 1A, a display device DD may be disposed in an interior of a vehicle AM. The display device DD may be disposed in an interior of the vehicle AM and may provide various information to a driver DV (or a user). The display device DD may provide images indicating information, such as weather, speed, maps, or movies, to the driver DV. The display device DD may be a touch-based display device that may be operated according to a touch input of the driver DV.

Referring to FIGS. 1A and 1B, the display device DD may have a plane that is defined by a first direction DR1 and a second direction DR2 that cross each other. The display device DD may have long sides that extend in the first direction DR1 and short sides that extend in the second direction DR2. Corners of the display device DD, which connect the long sides and the short sides to each other, may have a curved shape.

Hereinafter, a direction that substantially perpendicularly crosses a plane that is defined by the first direction DR1 and the second direction DR2 is defined as a third direction DR3. Furthermore, in the specification, "when viewed on a plane" is defined as a state viewed in the third direction DR3.

A front surface of the display device DD may be defined as a display surface DS and may have a plane that is defined by the first direction DR1 and the second direction DR2. Images IM that are generated by the display device DD may be provided to the user through the display surface DS.

The display surface DS may have a display area DA and a non-display area NDA that surrounds (e.g., extends around a periphery of) the display area DA. The display area DA may display an image, and the non-display area NDA may not display an image. The non-display area NDA may surround the display area DA and may define a periphery of the display device DD and may be printed in a color (e.g., a predetermined color).

By way of example, the display device DD for a vehicle is illustrated, but embodiments of the present disclosure are not limited thereto. For example, the display device DD according to an embodiment of the present disclosure may be used in electronic devices, such as smartphones, digital cameras, laptop computers, monitors, and smart televisions that provide images to users.

Figure 2A:
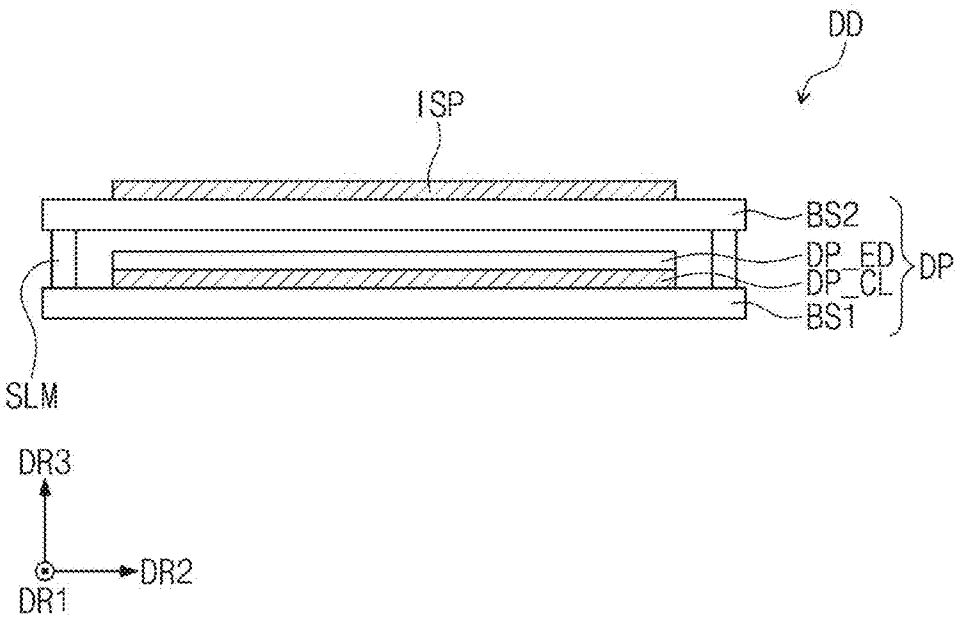
FIG. 2A is a cross-sectional view of a display device according to an embodiment of the present disclosure.
Figure 2B:
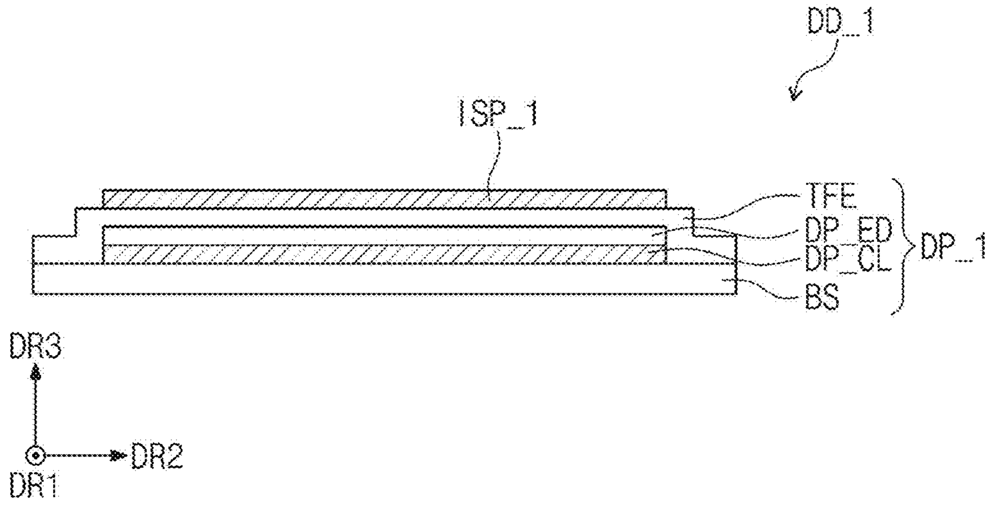
FIG. 2B is a cross-sectional view of a display device according to an embodiment of the present disclosure.
Figure 3A:
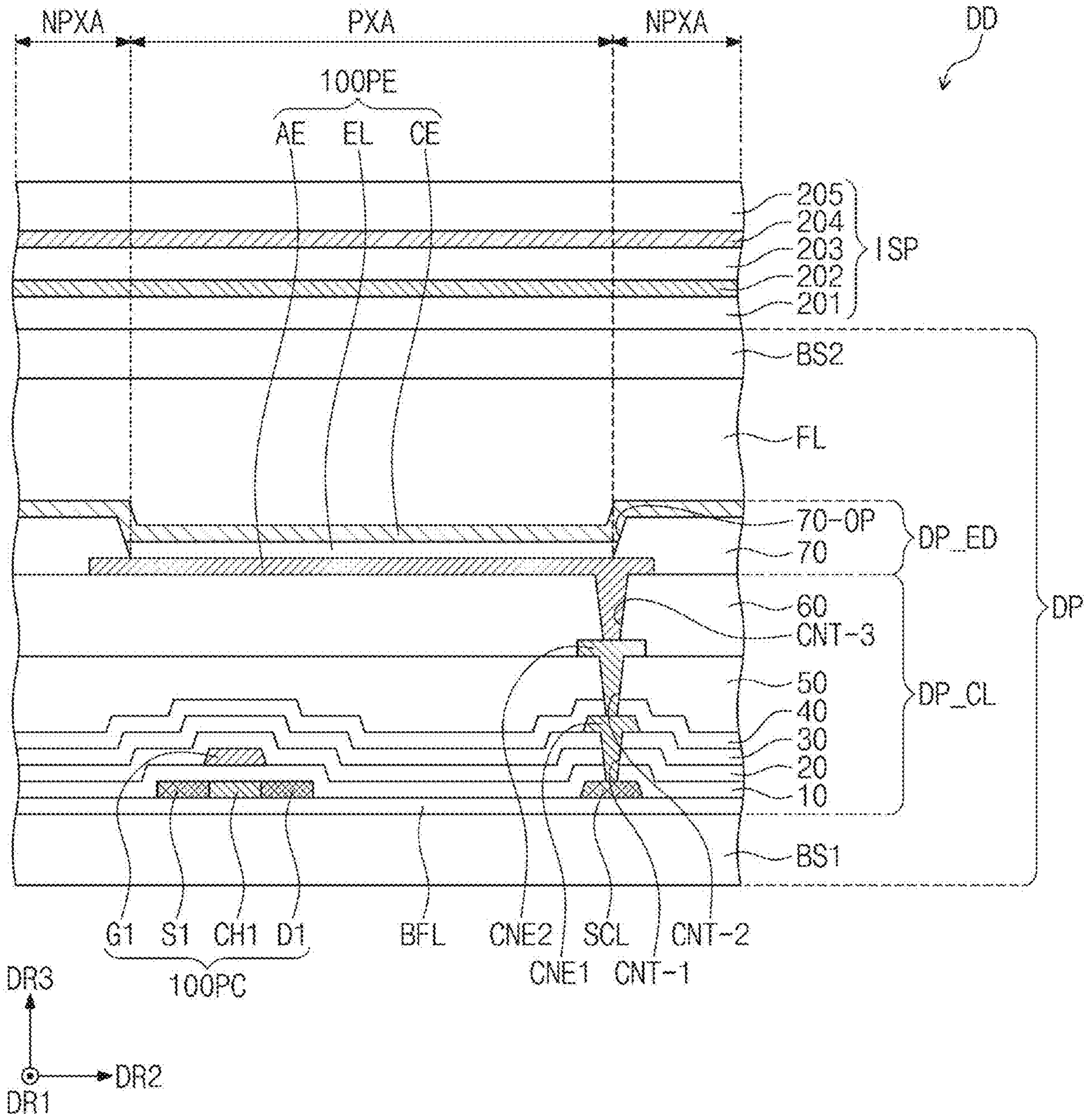
FIG. 3A is an enlarged cross-sectional view of a portion of the display device illustrated in FIG. 2A.
Figure 3B:
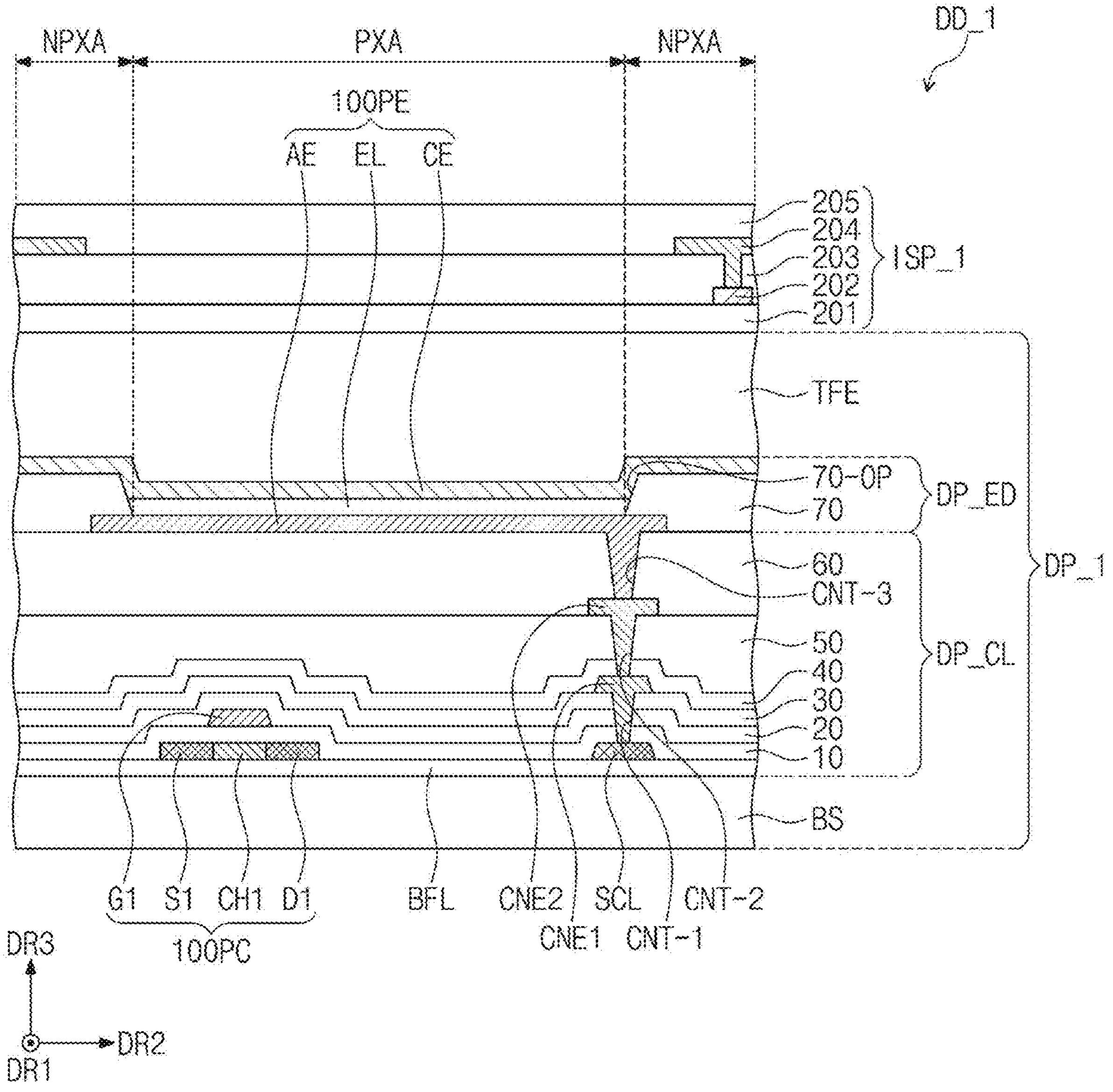
FIG. 3B is an enlarged cross-sectional view of a portion of the display device illustrated in FIG. 2B.

FIG. 2A is a cross-sectional view of a display device according to an embodiment of the present disclosure, and FIG. 2B is a cross-sectional view of a display device according to an embodiment of the present disclosure. FIG. 3A is an enlarged cross-sectional view of a portion of the display device illustrated in FIG. 2A, and FIG. 3B is an enlarged cross-sectional view of a portion of the display device illustrated in FIG. 2B.

Referring to FIG. 2A, the display device DD may include a display panel DP and an input sensing layer ISP. The input sensing layer ISP may be referred to as an input sensing panel.

The display panel DP may include a first base layer BS1, a display circuit layer DP_CL, a display element layer DP_ED, a second base layer BS2, and a coupling member SLM. The input sensing layer ISP may be disposed on the second base layer BS2.

Each of the first base layer BS1 and the second base layer BS2 may be a silicon substrate, a plastic substrate, a glass substrate, an insulating film, or a laminated structure including a plurality of insulating layers.

The display circuit layer DP_CL may be disposed on the first base layer BS1. The display circuit layer DP_CL may include a plurality of insulating layers, a plurality of conductive layers, and a semiconductor layer. The plurality of conductive layers of the display circuit layer DP_CL may constitute signal lines or a control circuit for pixels.

The display element layer DP_ED may be disposed on the display circuit layer DP_CL. The display element layer DP_ED may include light emitting elements. For example, the display element layer DP_ED may include organic light emitting diodes, inorganic light emitting diodes, quantum dots, quantum rods, micro LEDs, or nano LEDs.

The second base layer BS2 may be disposed on the display element layer DP_ED. A space (e.g., a specific or defined space) may be defined between the second base layer BS2 and the display element layer DP_ED. The space may be filled with air or an inert gas. Furthermore, in an embodiment of the present disclosure, the space may be filled with a filling layer FL (see, e.g., FIG. 3A), such as a silicone-based polymer, an epoxy-based resin, or an acrylic-based resin.

The coupling member SLM may be disposed between the first base layer BS1 and the second base layer BS2. The coupling member SLM may couple the first base layer BS1 and the second base layer BS2 to each other. The coupling member SLM may include an organic material, such as a photo-curable resin or a photoplastic resin, or an inorganic material, such as a frit seal, but the present disclosure is not limited to any one embodiment.

The input sensing layer ISP may include a plurality of insulating layers and a plurality of conductive layers. The plurality of conductive layers may constitute (or may form) sensing electrodes that sense an external input, sensing lines that are electrically connected to the sensing electrodes, and sensing pads that are electrically connected to the sensing lines.

Referring to FIG. 2B, a display device DD_1 may include a display panel DP_1 and an input sensing layer ISP_1.

The display panel DP_1 may include a base layer BS, a display circuit layer DP_CL, a display element layer DP_ED, and an encapsulation layer TFE. The base layer BS may be flexible. The input sensing layer ISP_1 may be disposed on the encapsulation layer TFE. According to an embodiment of the present disclosure, the display panel DP_1 and the input sensing layer ISP_1 may be formed through a continuous process. For example, the input sensing layer ISP_1 may be formed directly on the encapsulation layer TFE.

Referring to FIGS. 2A and 3A, at least one inorganic layer may be formed on an upper surface of the first base layer BS1 in the display panel DP. The inorganic layer may include at least one of aluminum oxide, titanium oxide, silicon oxide, silicon oxynitride, silicon nitride, zirconium oxide, and hafnium oxide. The inorganic layer may be formed as a multilayer structure. The multilayer inorganic layers may include a barrier layer and/or a buffer layer. In the illustrated embodiment, the display panel DP includes a buffer layer BFL.

The buffer layer BFL may improve a coupling strength between the first base layer BS1 and the semiconductor pattern. The buffer layer BFL may include a silicon oxide layer and a silicon nitride layer, and the silicon oxide layer and the silicon nitride layer may be alternately stacked on each other.

A semiconductor pattern may be disposed on the buffer layer BFL. The semiconductor pattern may include polysilicon. However, the present disclosure is not limited thereto, and the semiconductor pattern may include amorphous silicon, low-temperature polycrystalline silicon, or an oxide semiconductor.

FIG. 3A illustrates some semiconductor patterns, and additional semiconductor patterns may be disposed in other areas. The semiconductor patterns may be arranged in specific rules (or configurations) across pixels. The semiconductor patterns may have different electrical properties depending on whether or not they are doped. The semiconductor pattern may include a first region having a high conductivity and a second region having a low conductivity. The first region may be doped with an N-type dopant or a P-type dopant. A P-type transistor may include a doped area that is doped with a P-type dopant, and an N-type transistor may include a doped area that is doped with an N-type dopant. The second area may be an undoped region or may be doped at a lower concentration than that of the first region.

A conductivity of the first area is greater than that of the second area and may substantially act as an electrode or a signal line. The second area may substantially correspond to a channel area of a transistor. In other words, a part of the semiconductor pattern may be a channel part of the transistor, another part may be a source or a drain of the transistor, and another part may be a connection electrode or a connection signal line.

Each of the pixels may have an equivalent circuit including a plurality of transistors, at least one capacitor, and a light emitting element, and the equivalent circuit of the pixel may be modified into various forms. FIG. 3A illustrates one transistor 100PC and a light emitting element 100PE included in a pixel.

The transistor 100PC may include a source S1, a channel part CH1, a drain D1, and a gate G1. The source S1, the channel part CH1, and the drain D1 may be formed from a semiconductor pattern. The source S1 and the drain D1 may extend in opposite directions from the channel part CH1 on a cross-sectional view. FIG. 3A illustrates a portion of a connection signal line SCL formed from a semiconductor pattern. The connection signal line SCL may be electrically connected to the drain D1 of the transistor 100PC on a plane.

A first insulating layer 10 may be disposed on the buffer layer BFL. The first insulating layer 10 may commonly overlap the plurality of pixels and may cover the semiconductor pattern. The first insulating layer 10 may be an inorganic layer and/or an organic layer and may have a monolayer or multilayer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a monolayer of silicon oxide. The insulating layers of the display circuit layer DP_CL, which will be described later, as well as the first insulating layer 10, may be inorganic layers and/or organic layers, and may have a monolayer or multilayer structure. The inorganic layer may include at least one of the above-mentioned materials, but the present disclosure is not limited thereto.

The gate G1 is disposed on the first insulating layer 10. The gate G1 may be a part of a metal pattern. The gate G1 overlaps the channel part CH1. In a process of doping the semiconductor pattern, the gate G1 may act as a mask.

A second insulating layer 20 may be disposed on the first insulating layer 10 and may cover the gate G1. The second insulating layer 20 may commonly overlap the pixels. The second insulating layer 20 may be an inorganic layer and/or an organic layer and may have a monolayer or multilayer structure. The second insulating layer 20 may include at least one of silicon oxide, silicon nitride, and silicon oxynitride. In an embodiment, the second insulating layer 20 may have a multilayer structure including a silicon oxide layer and a silicon nitride layer.

A third insulating layer 30 may be disposed on the second insulating layer 20. The third insulating layer 30 may have a monolayer or multilayer structure. For example, the third insulating layer 30 may have a multilayer structure including a silicon oxide layer and a silicon nitride layer.

A first connection electrode CNE1 may be disposed on the third insulating layer 30. The first connection electrode CNE1 may be connected to the connection signal line SCL through a contact hole (e.g., a contact opening) CNT-1 that passes through the first, second, and third insulating layers 10, 20, and 30.

A fourth insulating layer 40 may be disposed on the third insulating layer 30. The fourth insulating layer 40 may be a monolayer of silicon oxide. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole (e.g., contact opening) CNT-2 that passes through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The display element layer DP_ED may be disposed on the display circuit layer DP_CL. The display element layer DP_ED may include the light emitting element 100PE and a pixel definition film 70. For example, the display element layer DP_ED may include an organic light emitting material, an inorganic light emitting material, quantum dots, quantum rods, micro LEDs, or nano LEDs. Hereinafter, an embodiment in which the light emitting element 100PE is an organic light emitting element will be described, but the present disclosure is not limited thereto.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 through a contact hole (e.g., a contact opening) CNT-3 that passes through the sixth insulating layer 60.

The pixel definition film 70 may be disposed on the sixth insulating layer 60 and may cover a portion of the first electrode AE. An opening 70-OP is defined in pixel definition film 70. The opening 70-OP in the pixel definition film 70 exposes at least a portion of (e.g., a central portion of) the first electrode AE.

The display area DA (see, e.g., FIG. 1B) may have a light emitting area PXA and a non-light emitting area NPXA that is adjacent to the light emitting area PXA. The non-light emitting area NPXA may surround (e.g., may extend around a periphery of) the light emitting area PXA. In the embodiment, the light emitting area PXA is defined as corresponding to a partial area of the first electrode AE, which is exposed by (or is exposed through) the opening 70-OP.

The light emitting layer EL may be disposed on the first electrode AE. The light emitting layer EL may be disposed in an area corresponding to the opening 70-OP. For example, the light emitting layer EL may be formed separately in each of the pixels. When the light emitting layer EL is formed separately in each of the pixels, each of the light emitting layers EL may emit light of at least one color from among blue, red, and green. However, the present disclosure is not limited thereto, and the light emitting layer EL may be connected to the pixels and be provided in common. In such an embodiment, the light emitting layer EL may provide blue light or white light.

The second electrode CE may be disposed on the light emitting layer EL. The second electrode CE may have an integrated shape and may be commonly disposed in the plurality of pixels.

In some embodiments, a hole control layer may be disposed between the first electrode AE and the light emitting layer EL. The hole control layer may be commonly disposed in the light emitting area PXA and the non-light emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plurality of pixels by using an open mask.

The second base layer BS2 may be disposed on the display element layer DP-ED. In one embodiment, the first and second base layers BS1, BS2 may be rigid.

A filling layer FL may be disposed between the first base layer BS1 (or the display element layer DP-ED) and the second base layer BS2. The filling layer FL may be disposed in a space that is sealed by the coupling member SLM (see, e.g., FIG. 2A) between the first and second base layers BS1 and BS2. The filling layer FL may include a thermosetting material.

The input sensing layer ISP may be disposed directly on the display panel DP. For example, the input sensing layer ISP may be disposed directly on the second base layer BS2.

Referring to FIGS. 2B and 3B, the encapsulation layer TFE may be disposed on the display element layer DP_ED. The encapsulation layer TFE may include an inorganic layer, an organic layer, and an inorganic layer that are sequentially stacked, but the layers that constitute the encapsulation layer TFE are not limited thereto.

The inorganic layers may protect the display element layer DP_ED from moisture and oxygen, and the organic layer may protect the display element layer DP_ED from foreign substances, such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but the present disclosure is not limited thereto.

The input sensing layer ISP_1 may be formed on the display panel DP_1 through a continuous process. In such an embodiment, the input sensing layer ISP_1 may be expressed as being disposed directly on the display panel DP_1 (e.g., the encapsulation layer TFE). As used herein, being "directly disposed" means that no component is disposed between the input sensing layer ISP_1 and the display panel DP_1. That is, a separate adhesive member or coupling member is not disposed between the input sensing layer ISP_1 and the display panel DP_1. Alternatively, the input sensing layer ISP_1 may be coupled to the display panel DP_1 through an adhesive member or coupling member. The adhesive member may include a conventional adhesive or binder.

Referring to FIGS. 3A and 3B, the input sensing layer ISP and ISP_1 may include a base insulating layer 201, a first conductive layer 202, an intermediate insulating layer 203, a second conductive layer 204, and a cover insulating layer 205.

The base insulating layer 201 may be an inorganic layer including at least any one of silicon nitride, silicon oxynitride, and silicon oxide. In another embodiment, the base insulating layer 201 may be an organic layer including an epoxy resin, an acrylic resin, or an imide-based resin. The base insulating layer 201 may have a monolayer structure or a multilayer structure including layers stacked along the third direction DR3.

Each of the first conductive layer 202 and the second conductive layer 204 may have a monolayer structure or a multilayer structure including layers stacked along the third direction DR3.

The conductive layer of a monolayer structure may include a metal layer or a transparent conductive layer. The metal layer may include molybdenum, silver, titanium, copper, or aluminum, or an alloy thereof. The transparent conductive layer may include a transparent conductive oxide, such as indium tin oxide (ITO), indium zinc oxide (IZO), zinc oxide (ZnO), or indium zinc tin oxide (IZTO). In addition, the transparent conductive layer may include conductive polymers, such as PEDOT, metal nanowires, and graphene.

The conductive layer of a multilayer structure may include metal layers. For example, the metal layers may have a three-layer structure of titanium/aluminum/titanium. The multilayer conductive layer may include at least one metal layer and at least one transparent conductive layer.

At least any one of the intermediate insulating layer 203 and the cover insulating layer 205 may include an inorganic film. The inorganic film may include at least one of aluminum oxide, titanium oxide, silicon oxide, silicon nitride, silicon oxynitride, zirconium oxide, and hafnium oxide.

At least any one of the intermediate insulating layer 203 and the cover insulating layer 205 may include an organic film. The organic film may include at least any one of an acrylic resin, a methacrylic resin, a polyisoprene, a vinyl resin, an epoxy resin, a urethane resin, a cellulose resin, a siloxane resin, a polyimide resin, a polyamide resin, and a perylene resin.

Figure 4:
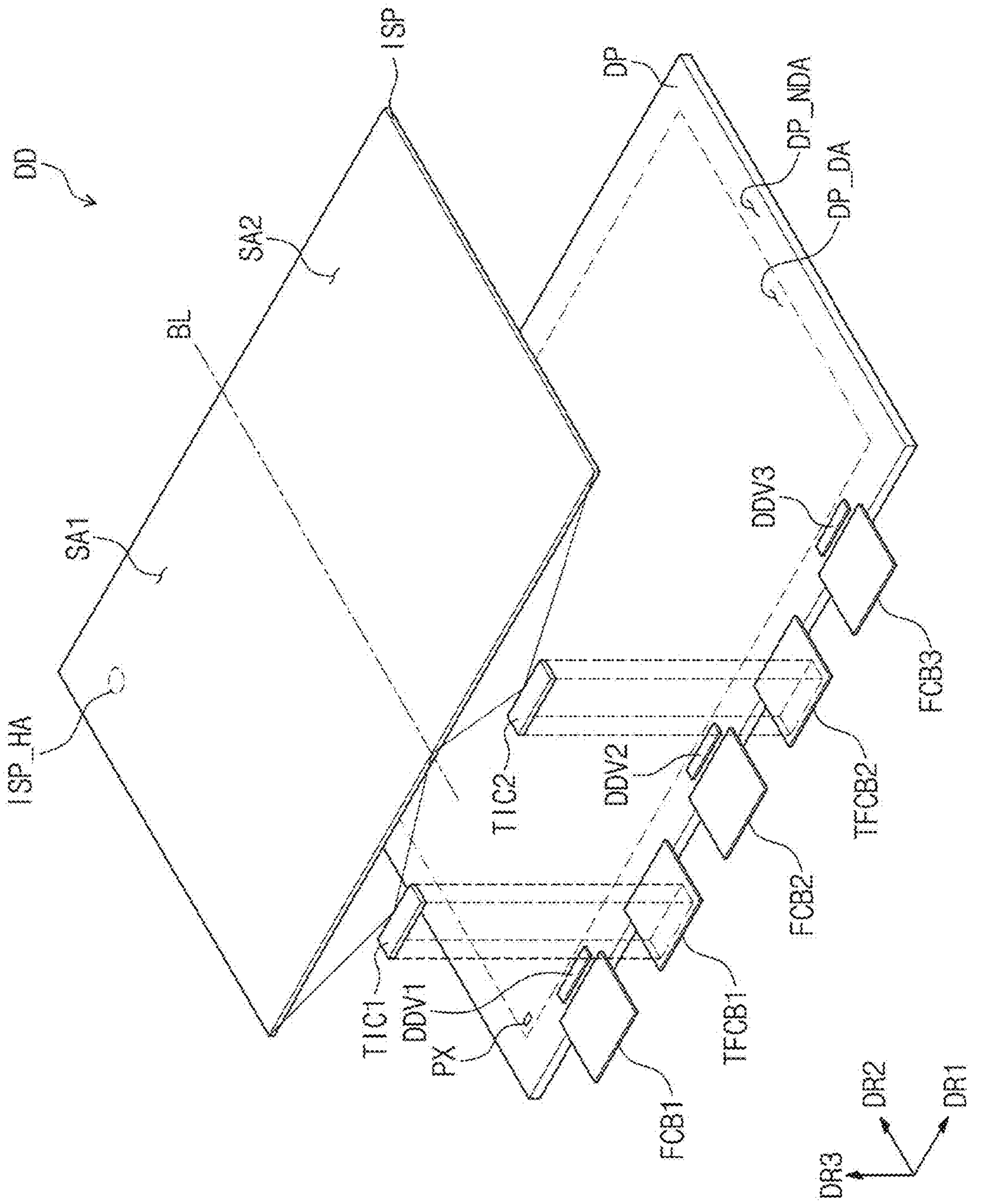
FIG. 4 is an exploded perspective view of a display device according to an embodiment of the present disclosure.

FIG. 4 is an exploded perspective view of a display device according to an embodiment of the present disclosure.

Referring to FIG. 4, the display device DD may include the display panel DP and the input sensing layer ISP.

The display panel DP may be a device or element that produces images. The display panel DP may be a light emitting display panel, and for example, the display panel DP may be an organic light emitting display panel, a quantum dot display panel, a micro LED display panel, or a nano LED display panel.

The display panel DP has a display area DP_DA that displays an image IM (see, e.g., FIG. 1B) and a non-display area DP_NDA that is adjacent to the display area DP_DA. The display area DP_DA may be an area corresponding to the display area DA illustrated in FIG. 1B, and the non-display area DP_NDA may be an area corresponding to the non-display area NDA illustrated in FIG. 1B. The display area DP_DA is an area at where the image is displayed, and the non-display area DP_NDA is a bezel area at where the image is not displayed. FIG. 4 illustrates an embodiment in which the non-display area DP_NDA is disposed to surround the display area DP_DA, but the present disclosure is not limited thereto. The non-display area DP_NDA may be disposed only on at least one side of the display area DP_DA.

The display panel DP includes a plurality of pixels PX and signal lines that are connected to the plurality of pixels PX. Each of the plurality of pixels PX may include a light emitting element. The signal lines may include data lines, scan lines, emission control lines, and power lines.

The input sensing layer ISP may be disposed on the display panel DP. The input sensing layer ISP may sense an input from outside. According to an embodiment of the present disclosure, the input sensing layer ISP may be disposed to overlap the display area DP_DA. The input sensing layer ISP may have a plurality of areas. FIG. 4 illustrates, by way of example, that the input sensing layer ISP is divided into two areas by an imaginary boundary line BL, but the number of areas of the input sensing layer ISP is not limited thereto. Hereinafter, the two areas are referred to as a first sensing area SA1 and a second sensing area SA2, respectively. The first and second sensing areas SA1 and SA2 may be adjacent to each other in the first direction DR1.

The display device DD may further include a plurality of display driving chips (hereinafter, referred to as first to third display driving chips DDV1 to DDV3) and a plurality of flexible circuit films (hereinafter, referred to as first to third flexible circuit films FCB1 to FCB3). The first to third display driving chips DDV1 to DDV3 may be mounted on the non-display area DP_NDA of the display panel DP. The first to third flexible circuit films FCB1 to FCB3 may be attached (or coupled) to one side of the display panel DP and may be electrically connected to the first to third display driving chips DDV1 to DDV3, respectively.

FIG. 4 illustrates an embodiment in which the first to third display driving chips DDV1 to DDV3 are mounted on the display panel DP, but the present disclosure is not limited thereto. For example, the first to third display driving chips DDV1 to DDV3 may be mounted on the first to third flexible circuit films FCB1 to FCB3 by using a chip on film (COF) method.

The display device DD may further include a first sensor controller TIC1 and a second sensor controller TIC2 for controlling driving of the input sensing layer ISP. According to an embodiment of the present disclosure, two sensor controllers TIC1 and TIC2 may be included, but the present disclosure is not limited thereto. When a size of the input sensing layer ISP increases, the number of the sensor controllers TIC1 and TIC2 may increase.

The first sensor controller TIC1 may control driving of the first sensing area SA1 of the input sensing layer ISP, and the second sensor controller TIC2 may control driving of the second sensing area SA2 of the input sensing layer ISP. Each of the first and second sensor controllers TIC1 and TIC2 may be configured in the form of a chip (e.g., an IC) and may be mounted on first and second touch flexible circuit films TFCB1 and TFCB2, respectively. FIG. 4 illustrates an embodiment in which the first and second touch flexible circuit films TFCB1 and TFCB2 are provided as separate configurations from the first to third flexible circuit films FCB1 to FCB3, but the present disclosure is not limited thereto. For example, when the first touch flexible circuit film TFCB1 is formed integrally with the first or second flexible circuit films FCB1 or FCB2, the first sensor controller TIC1 may be mounted on the first and second flexible circuit films FCB1 or FCB2.

The first and second sensor controllers TIC1 and TIC2 calculate coordinate information of the input based on the received signals received from the input sensing layer ISP, and the display device DD executes an operation corresponding to the input based on a coordinate signal.

Figure 5:
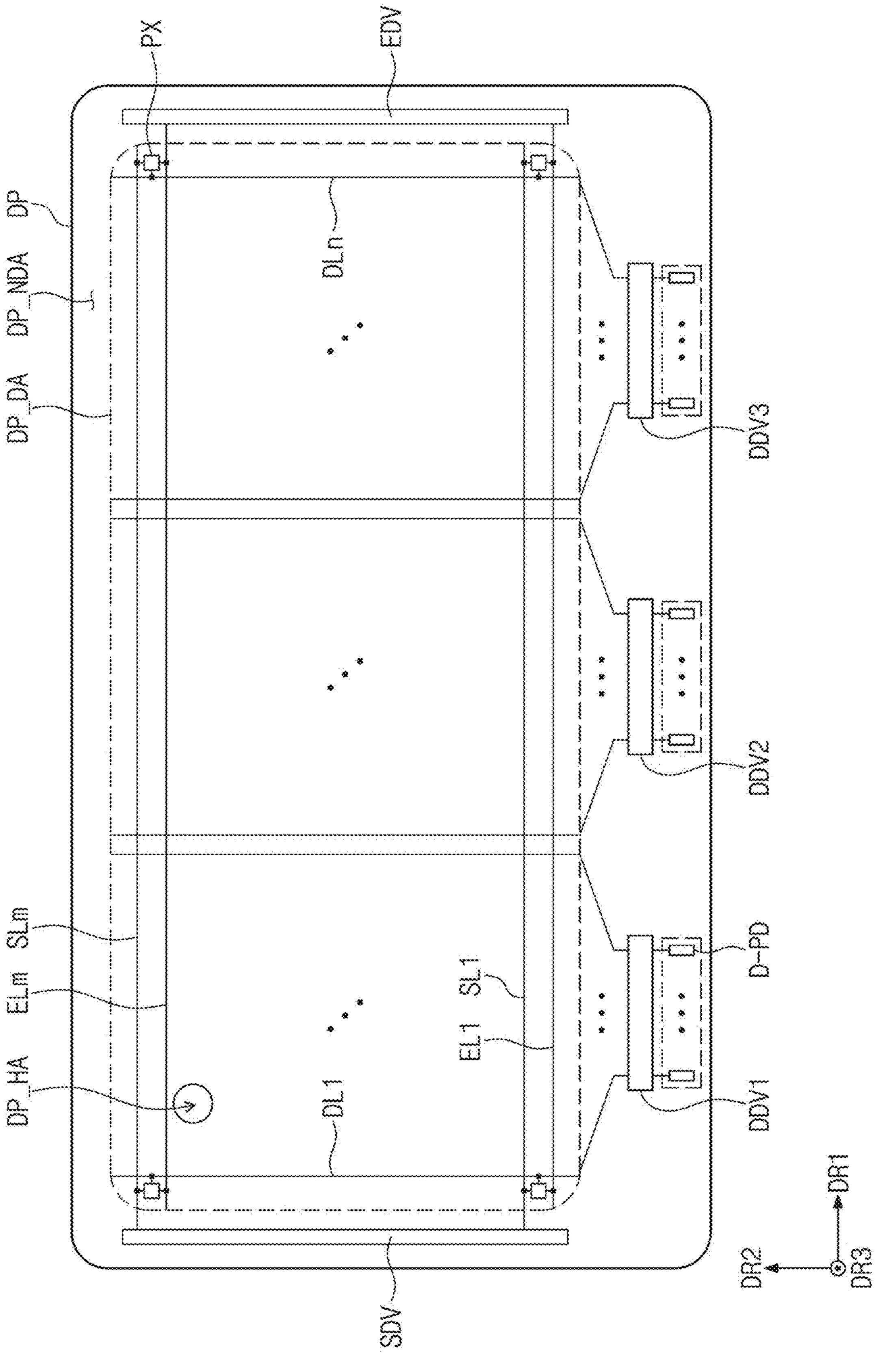
FIG. 5 is a plan view of a display panel illustrated in FIG. 4.

FIG. 5 is a plan view of a display panel illustrated in FIG. 4.

Referring to FIG. 5, the display device DD may include the display panel DP, a scan driving circuit SDV, a plurality of display driving chips DDV1 to DDV3, a light emission driving circuit EDV, and a plurality of pads D-PD.

The display panel DP may have long sides that extend in the first direction DR1 and short sides that extend in the second direction DR2. Corners of the display panel DP, which connect the long sides and the short sides, may have a curved shape that are outwardly convex.

The display panel DP may include a display area DP_DA and a non-display area DP_NDA that surrounds the display area DP_DA. The display area DP_DA may have a shape corresponding to the display panel DP. Accordingly, the display area DP_DA has long sides that extend in the first direction DR1 and short sides that extend in the second direction DR2, and the corners of the display area DP_DA, which connect the long sides and the short sides, may have a curved shape that are outwardly convex.

The display panel DP may include a plurality of pixels PX, a plurality of scan lines SL1 to SLm, a plurality of data lines DL1 to DLn, and a plurality of light emission control lines EL1 to ELm. As used herein, m and n are natural numbers.

The pixels PX may be disposed in (e.g., arranged in) the display area DP_DA. The scan driving circuit SDV and the light emission driving circuit EDV may be disposed in non-display areas DP_NDA that are adjacent to opposite sides of the display panel DP, which are opposite to each other in the first direction DR1 with the display area DP_DA therebetween. The display driving chips DDV1 to DDV3 may be disposed in a non-display area DP_NDA that is adjacent to one of the two sides of the display panel DP that are opposite to each other in the second direction DR2. When viewed on a plane, the display driving chips DDV1 to DDV3 may be adjacent to a lower end of the display panel DP.

The scan lines SL1 to SLm may extend in the first direction DR1 and may be connected to the pixels PX and the scan driving circuit SDV. The data lines DL1 to DLn may extend in the second direction DR2 and may be connected to the pixels PX and the display driving chips DDV1 to DDV3. The light emission control lines EL1 to ELm may extend in the first direction DR1 and may be connected to the pixels PX and the light emission driving circuit EDV.

The display driving chips DDV1 to DDV3 may be arranged in the first direction DR1. A certain number of data lines may be connected to each of the display driving chips DDV1 to DDV3. By way of an example, an embodiment in which three display driving chips DDV1 to DDV3 are provided is illustrated, but the number of the display driving chips DDV1 to DDV3 is not limited thereto. For example, as a leftward/rightward extent of the display panel DP increases, the number of the display driving chips DDV1 to DDV3 may also increase.

The pads D-PD may be disposed in the non-display area DP_NDA, which is adjacent to a lower end of the display panel DP, and the pads D-PD may be provided in positions that are adjacent to the display driving chips DDV1 to DDV3. The display driving chips DDV1 to DDV3 may be disposed between the pads D-PD and the data lines DL1 to DLn. Input terminals of the display driving chips DDV1 to DDV3 may be electrically connected to the pads D-PD, and output terminals thereof may be electrically connected to the data lines DL1 to DLn. The pads D-PD may be connected to the flexible circuit films FCB1 to FCB3 illustrated in, for example, FIG. 4.

The scan driving circuit SDV may generate a plurality of scan signals, and the scan signals may be applied to the pixels PX through the scan lines SL1 to SLm. The display driving chips DDV1 to DDV3 may generate a plurality of data voltages, and the data voltages may be applied to the pixels PX through the data lines DL1 to DLn. The light emission driving circuit EDV may generate a plurality of light emission control signals, and the light emission control signals may be applied to the pixels PX through the emission control lines EL1 to ELm.

The pixels PX may receive data voltages in response to the scan signals. The pixels PX may display an image by emitting light having a luminance corresponding to the data voltages in response to the light emission control signals.

A hole area (or an open area) DP_HA may be defined in the display panel DP. The hole area DP_HA may be defined in the display area DP_DA. The hole area DP_HA may be adjacent to a corner of an upper side of the display area DP_DA, but a location of the hole area DP_HA is not limited thereto. For example, the hole area DP_HA may be adjacent to a center of the upper side of the display area DP_DA. The hole area DP_HA may be defined by passing through a portion of the display panel DP in the third direction DR3.

Figure 6:
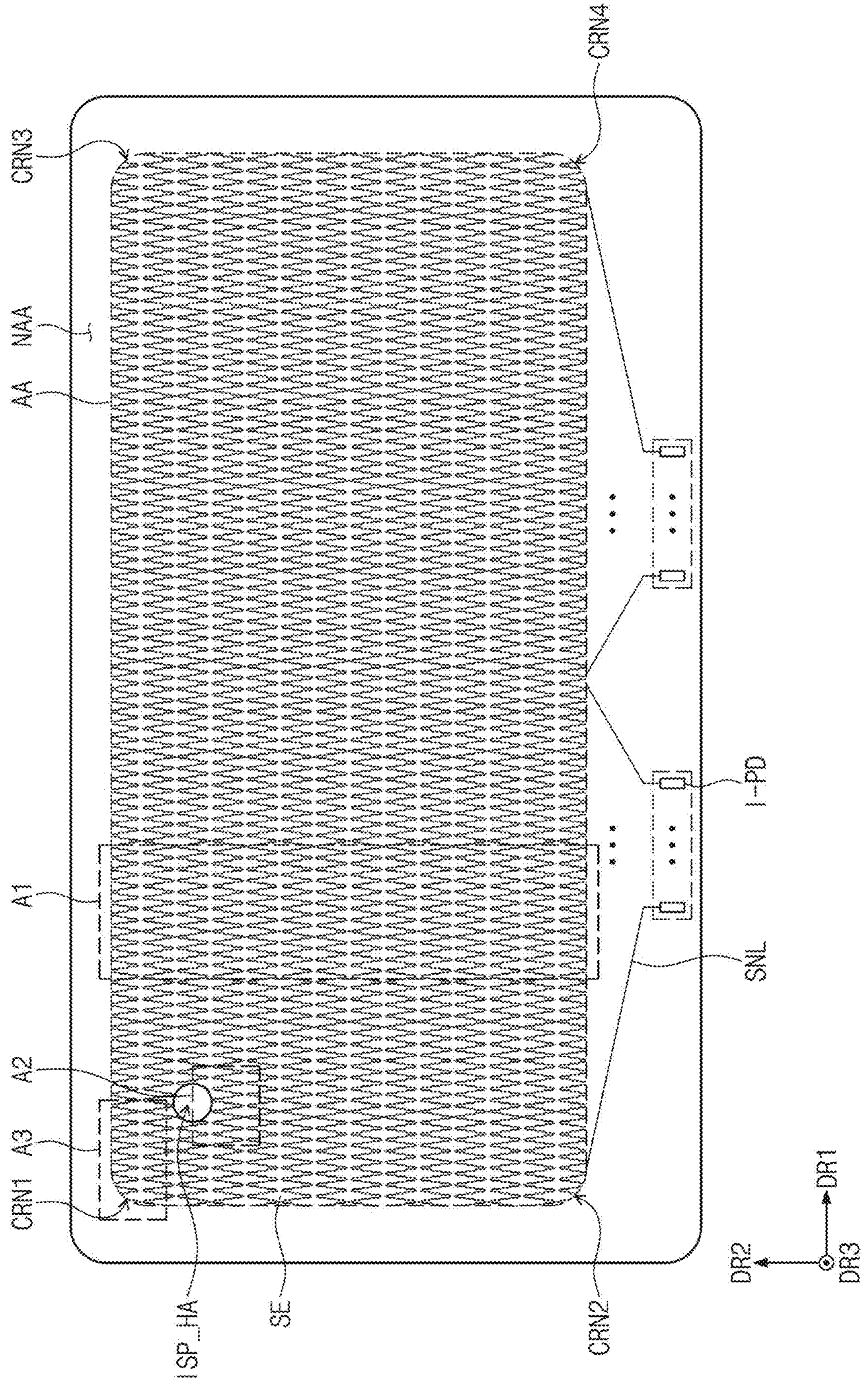
FIG. 6 is a plan view of an input sensing layer illustrated in FIG. 4.
Figure 7:
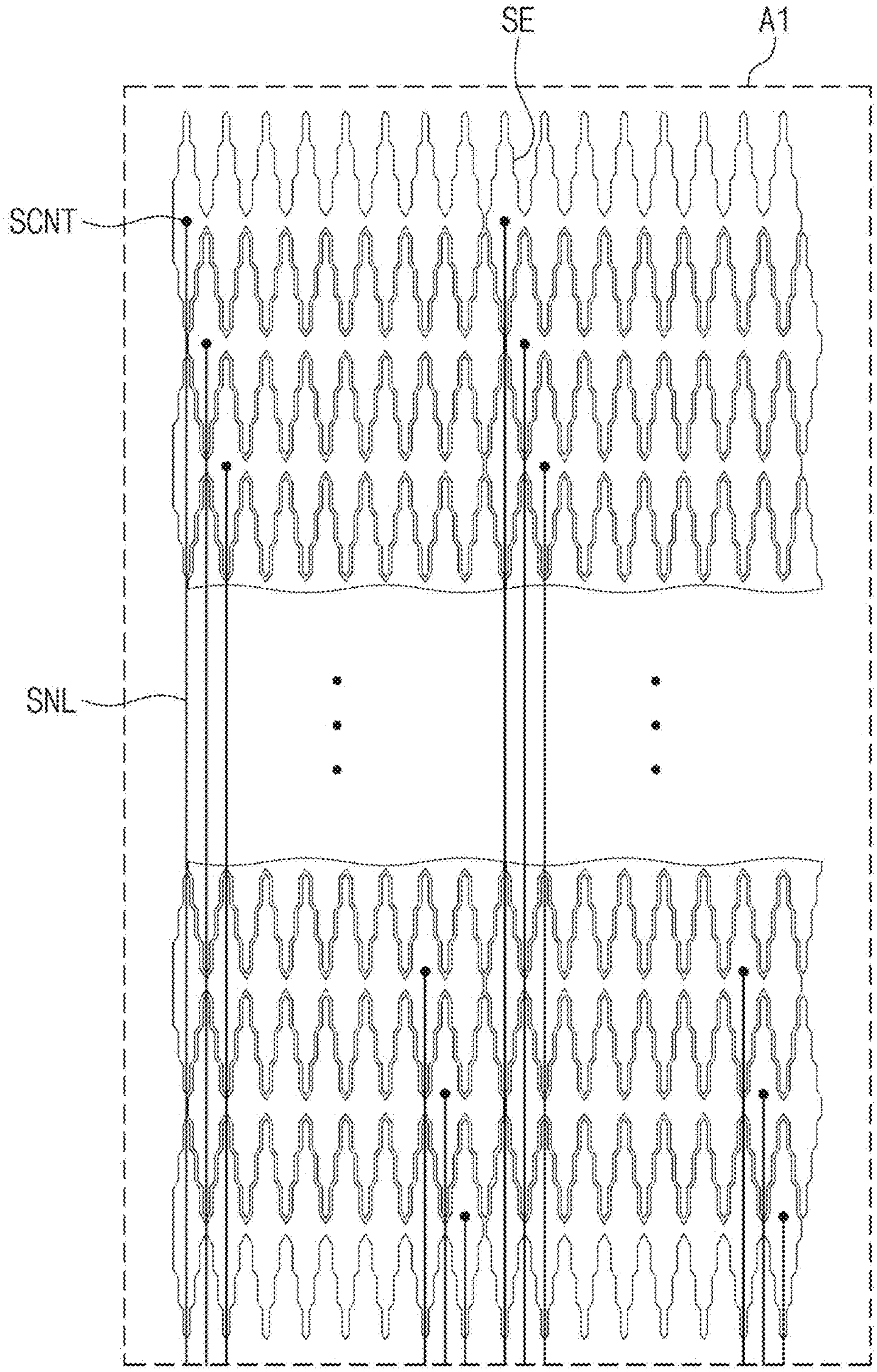
FIG. 7 is a view illustrating connection of sensing electrodes and trace lines disposed in the area A1 in FIG. 6.

FIG. 6 is a plan view of an input sensing layer illustrated in FIG. 4. FIG. 7 is a view illustrating connection of sensing electrodes and trace lines disposed in the area A1 illustrated in FIG. 6.

Referring to FIG. 6, the input sensing layer ISP may include a plurality of sensing electrodes SE.

The input sensing layer ISP may have long sides that extend in the first direction DR1 and short sides that extend in the second direction DR2. Corner parts of the input sensing layer ISP, which connect the long sides and the short sides of the input sensing layer ISP, may have a curved shape that is outwardly convex.

The input sensing layer ISP may have an active area AA and an inactive area NAA around the active area AA. The inactive area NAA may surround (e.g., may surround a periphery of) the active area AA. The active area AA may overlap the display area DP_DA (see, e.g., FIG. 5), and the inactive area NAA may overlap the non-display area DP_NDA (see, e.g., FIG. 5).

The active area AA may have a shape corresponding to the input sensing layer ISP. The active area AA may have long sides that extend in the first direction DR1 and short sides that extend in the second direction DR2. The active area AA may include at least one corner part having a curved shape. According to an embodiment of the present disclosure, the active area AA includes four corner parts (hereinafter referred to as first to fourth corner parts CRN1 to CRN4). For example, each of the first to fourth corner parts CRN1 to CRN4 of the active area AA that connect the long sides and short sides of the active area AA may have a curved shape that is outwardly convex.

The sensing electrodes SE may be disposed in the active area AA. The sensing electrodes SE may be arranged in the first direction DR1 and the second direction DR2. The sensing electrodes SE may be arranged in a matrix form to have unique coordinate information. The sensing electrodes SE are electrically separated (or insulated) from each other. By way of example, a boundary between the sensing electrodes SE is illustrated as a line, and substantially, the sensing electrodes SE may be disposed in an island shape while being spaced apart from each other without contacting each other.

The sensing electrodes SE may have the same shape as each other Each of the sensing electrodes SE may have a shape in which two facing sides (referred to as first sides and second sides) protrude in a sawtooth shape. For example, each of the sensing electrodes SE may include a first side that protrudes in a sawtooth shape in the second direction DR2, and a second side that protrudes in a sawtooth shape in a direction that is opposite to the second direction DR2. For example, when the first and second sides of each of the sensing electrodes SE are formed in a convexo-concave structure, the lengths of the first and second sides may be greater than when the sensing electrodes SE have a straight structure. As a result, a magnitude of a capacitance formed between two adjacent sensing electrodes SE may be increased, a large electrostatic capacitance may be secured while not increasing the extents of the sensing electrode SE within the limited size of the active area AA.

A hole area (or an open area) ISP_HA may be defined in the input sensing layer ISP. The hole area ISP_HA may be defined in the active area AA. The hole area ISP_HA may be defined by passing through a portion of the input sensing layer ISP in the third direction DR3. The hole area ISP_HA may correspond to the hole area DP_HA in the display panel DP.

Excluding the sensing electrodes SE that is adjacent to the hole area ISP_HA and the sensing electrodes SE that is adjacent to the corner parts CRN1 to CRN4, the sensing electrodes SE (referred to herein as typical sensing electrodes) may have the same shape and the same extent. The typical sensing electrodes SE may be referred to as first sensing electrodes. Different from the typical sensing electrodes, the sensing electrodes SE that are adjacent to the hole area ISP_HA and the sensing electrodes SE that are adjacent to the corner parts CRN1 to CRN4 (referred to herein as atypical sensing electrodes) may have atypical shapes. The atypical sensing electrodes SE may be referred to as second sensing electrodes. According to an embodiment of the present disclosure, the atypical sensing electrodes SE have a smaller extent than those of the typical sensing electrodes SE.

Referring to FIGS. 6 and 7, the sensing electrodes SE may be connected to the trace lines SNL. By way of example, the trace lines SNL in the inactive area NAA that is adjacent to a lower end of the input sensing layer ISP according to an embodiment are illustrated, but substantially, the trace lines SNL may be connected to the sensing electrodes SE in the active area AA and may extend to the inactive area NAA.

The trace lines SNL are connected to the sensing electrodes SE in one-to-one correspondence. The trace lines SNL and the sensing electrodes SE may be disposed on different layers in the effective area AA of the input sensing layer ISP. Each of the trace lines SNL is connected to a corresponding one SE of the plurality of sensing electrodes SE through a contact hole (e.g., a contact opening) SCNT. Each of the trace lines SNL may overlap at least one non-corresponding sensing electrode of the plurality of sensing electrodes SE in the effective area AA.

Pads I-PD may be disposed in the inactive area NAA that is adjacent to a lower end of the input sensing layer ISP. The trace lines SNL may be connected to the pads I-PD. The pads I-PD may be disposed at positions that do not overlap the pads D-PD on a plane as illustrated in, for example, FIG. 5. The pads I-PD may be connected to the touch flexible circuit films TFCB1 and TFCB2 illustrated in, for example, FIG. 4. Accordingly, the trace lines SNL may be electrically connected to the sensor controllers TIC1 and TIC2 through the pads I-PD and the touch flexible circuit films TFCB1 and TFCB2.

The input sensing layer ISP according to an embodiment of the present disclosure may be driven in a self-sensing mode and may acquire coordinate information in a self-cap method. The self-sensing mode will be described in detail with reference to FIGS. 8A to 8C.

Figure 8A:
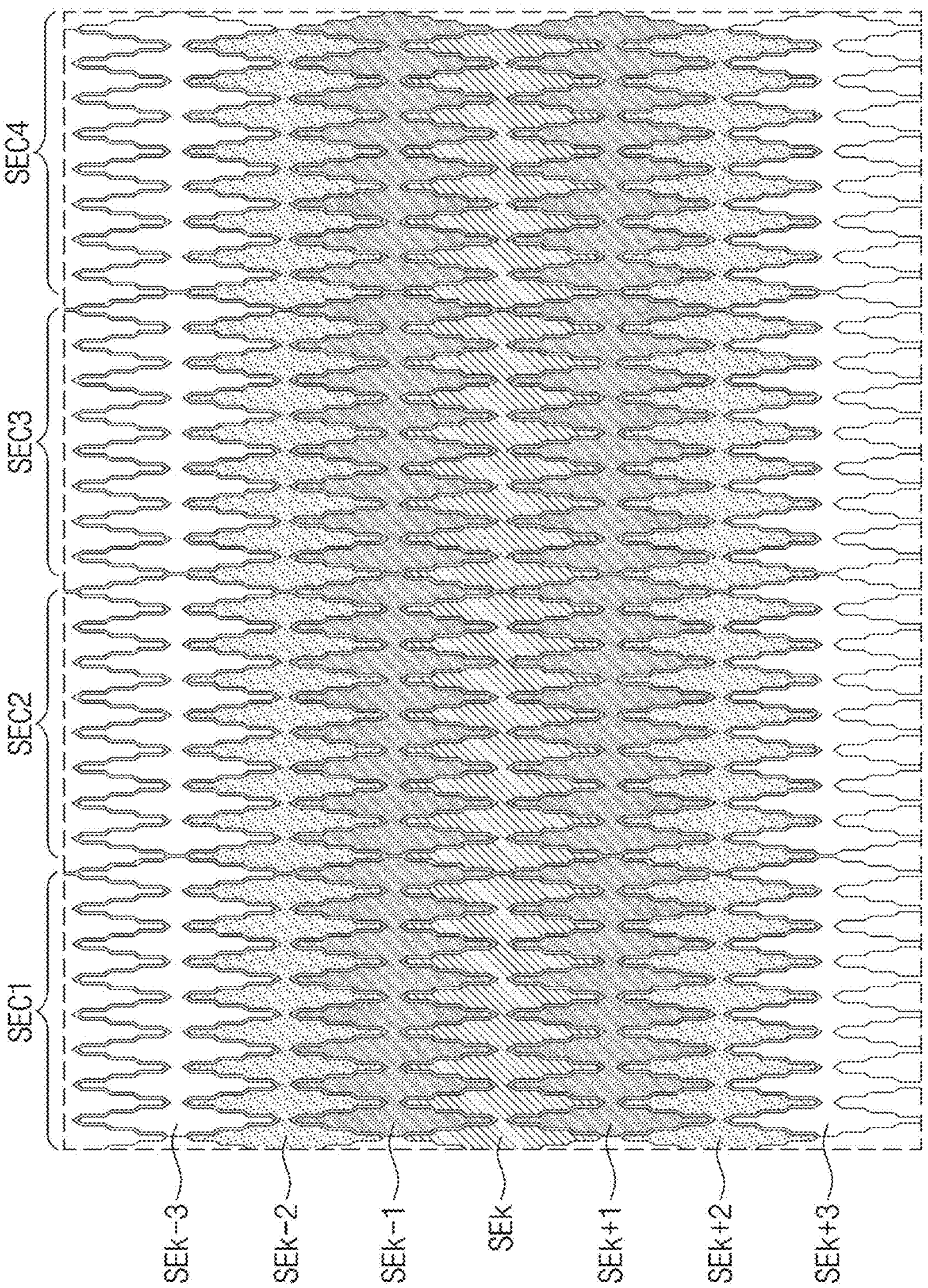
FIG. 8A is a view illustrating sensing electrodes in one area illustrated in FIG. 6.
Figure 8B:
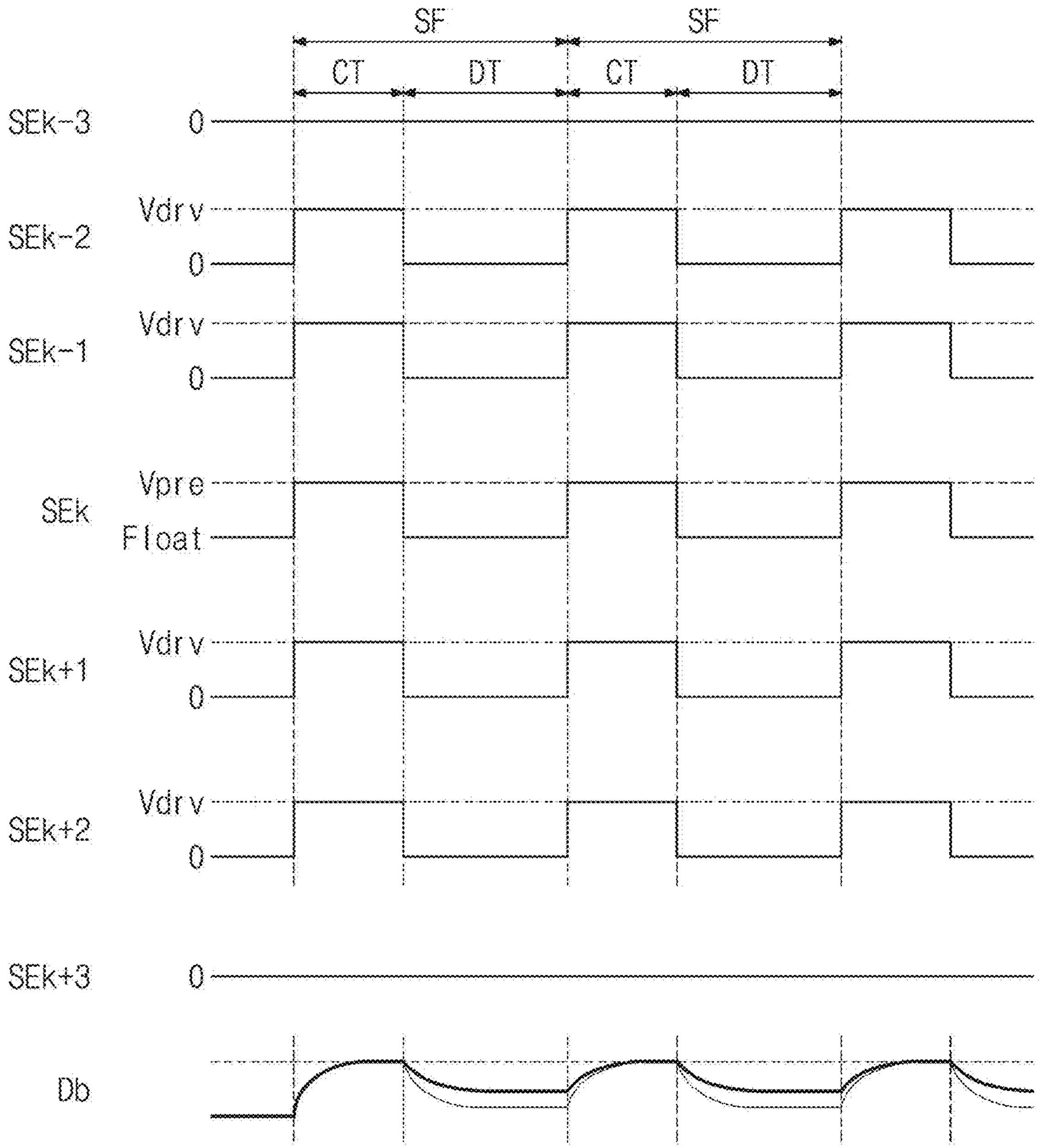
FIG. 8B is a waveform diagram of voltages applied to the sensing electrodes illustrated in FIG. 8A.
Figure 8C:
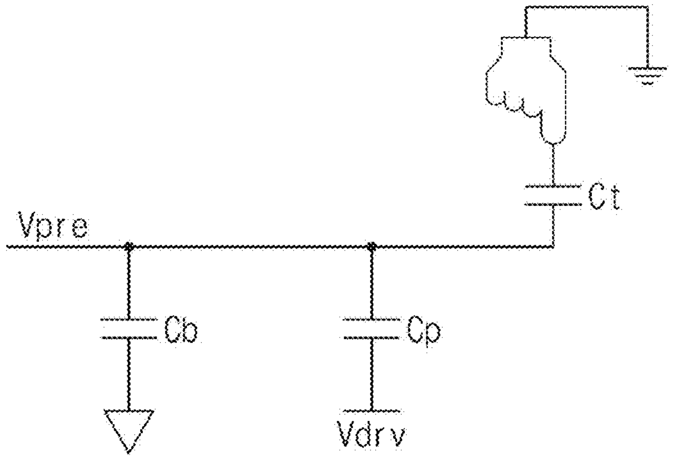
FIG. 8C is a circuit diagram illustrating a sensing capacitor in a charging section illustrated in FIG. 8B.
Figure 8D:
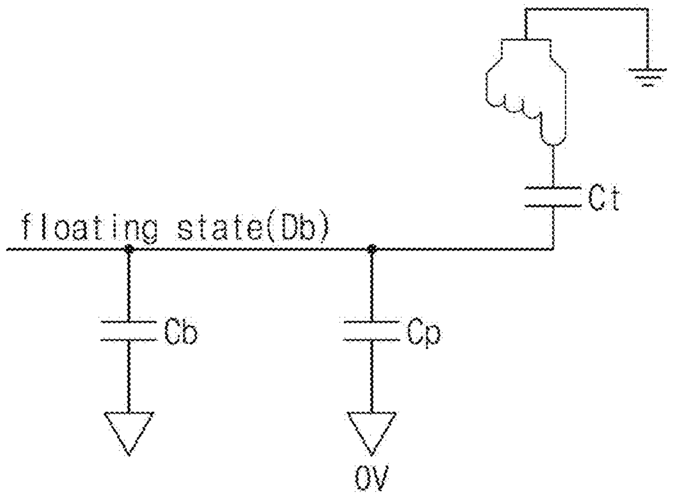
FIG. 8D is a circuit diagram illustrating a sensing capacitor in a discharging section illustrated in FIG. 8B.

FIG. 8A is a view illustrating sensing electrodes disposed in one area illustrated in FIG. 6. FIG. 8B is a waveform diagram illustrating voltages applied to the sensing electrodes illustrated in FIG. 8A. FIG. 8C is a circuit diagram illustrating a sensing capacitor in a charging section illustrated in FIG. 8B, and FIG. 8D is a circuit diagram illustrating the sensing capacitor in a discharging section illustrated in FIG. 8B.

FIG. 8A illustrates, by way of example, four sensing electrode rows SEC1 to SEC4 and seven sensing electrodes SEk−3 to SEk+3 included in each sensing electrode row SEC1 to SEC4. From among the seven sensing electrodes SEk−3 to SEk+3, a k-th sensing electrode SEk is a target sensing electrode that is to be sensed, and (k−2)-th, (k−1)-th, (k+1)-th, and (k+2)-th sensing electrodes SEk−2, SEk−1, SEk+1, and SEk+2 are adjacent sensing electrodes that are adjacent to the k-th sensing electrode SEk, and (k−3)-th and (k+3)-th sensing electrodes SEk−3 and SEk+3 are non-adjacent sensing electrodes that are not adjacent to the k-th sensing electrode SEk.

In the self-sensing mode, the sensor controller TIC1 (see, e.g., FIG. 4) may sense (or may determine) an amount of change in a charge of the target sensing electrode Sek from among the sensing electrodes SE based on a sensing frame SF. The sensing frame SF may include a charging section (e.g., a charging period) CT and a discharging section (e.g., a discharging period) DT.

The sensor controller TIC1 may apply a preliminary charging voltage Vpre to the target sensing electrode SEk during the charging section CT. The sensor controller TIC1 may apply a driving voltage Vdrv to the adjacent sensing electrodes SEk−2, SEk−1, SEk+1, and SEk+2 during the charging section CT. The sensor controller TIC1 may electrically float the target sensing electrode SEk during the discharging section DT. Furthermore, the sensor controller TIC1 may apply a reference voltage (e.g., a ground voltage (OV)) to the adjacent sensing electrodes SEk−2, SEk−1, and SEk+1, SEk+2 during the discharging section DT.

The reference voltage (OV) may be applied to the non-adjacent sensing electrodes SEk−3 and SEk+3 during the charging section CT and the discharging section DT.

Referring to FIGS. 8C and 8D, the target sensing electrode SEk forms a parasitic capacitor Cb with the second electrode CE (see, e.g., FIG. 3A) of the display panel DP (see, e.g., FIG. 3A), and the target sensing electrode SEk forms a sensing capacitor Cp with the adjacent electrodes SEk−1 and SEk+1. Furthermore, when an input (e.g., a touch input using a finger of the user) by the user occurs, the target sensing electrode SEk may form a touch capacitor Ct with the finger of the user.

Here, during the charging section CT, in which the preliminary charging voltage Vpre is applied to the target sensing electrode SEk, an amount of charge that is charged in the sensing capacitor Cp may be referred to as a first charge amount Q1, and during the discharging section DT, in which the target sensing electrode SEk is in a floating state, the amount of charge that is charged in the sensing capacitor Cp may be referred to as a second charge amount Q2.

The first charge amount Q1 and the second charge amount Q2 may be defined by Equation 1 and Equation 2 below, respectively. Here, Db may be defined as sensing data that are output through the target sensing electrode SEk during the discharging section DT.

$$Q1 = Vpre \times Cb + (Vpre - Vdrv) \times Cp + Vpre \times Ct \qquad \text{Equation 1}$$

$$Q2 = Db \times Cb + Db \times Cp + Db \times Ct \qquad \text{Equation 2}$$

According to the law of conservation of charge amounts, the first charge amount Q1 and the second charge amount Q2 are the same, and thus, sensing data Db that satisfies Equation 3 below may be calculated by using Equation 1 and Equation 2.

$$Db = Vpre - Vdrv \times \left(\frac{Cp}{Cp + Cp + Ct}\right) \qquad \text{Equation 3}$$

According to Equation 3, the sensing data Db may vary depending on a magnitude of the sensing capacitor Cp. That is, as the sensing capacitor Cp increases, the size of the sensed data Db may decrease, and as the sensing capacitor Cp decreases, the size of the sensed data Db may increase. The magnitude of the sensing capacitor Cp may be determined by the extent of the target sensing electrode SEk and the extent of the adjacent sensing electrodes SEk−2, SEk−1, SEk+1, and SEk+2.

Figure 9:
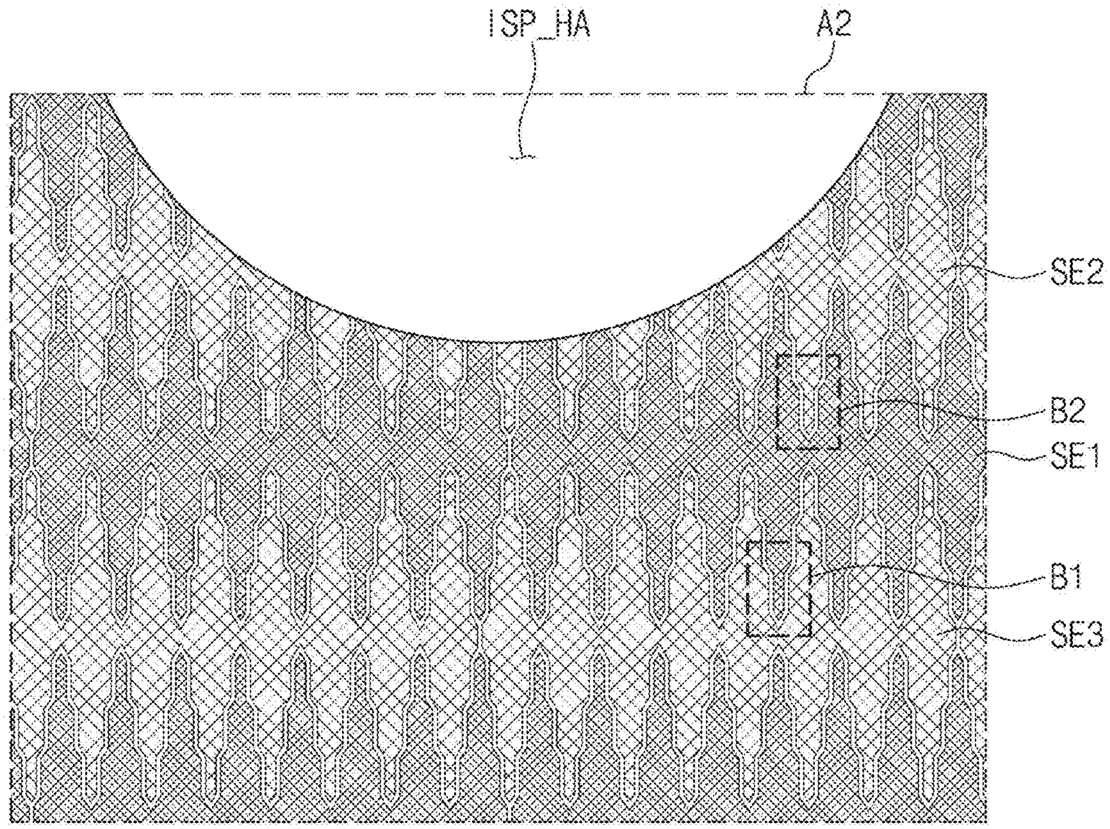
FIG. 9 is a plan view illustrating the area A2 in FIG. 6.
Figure 10A:
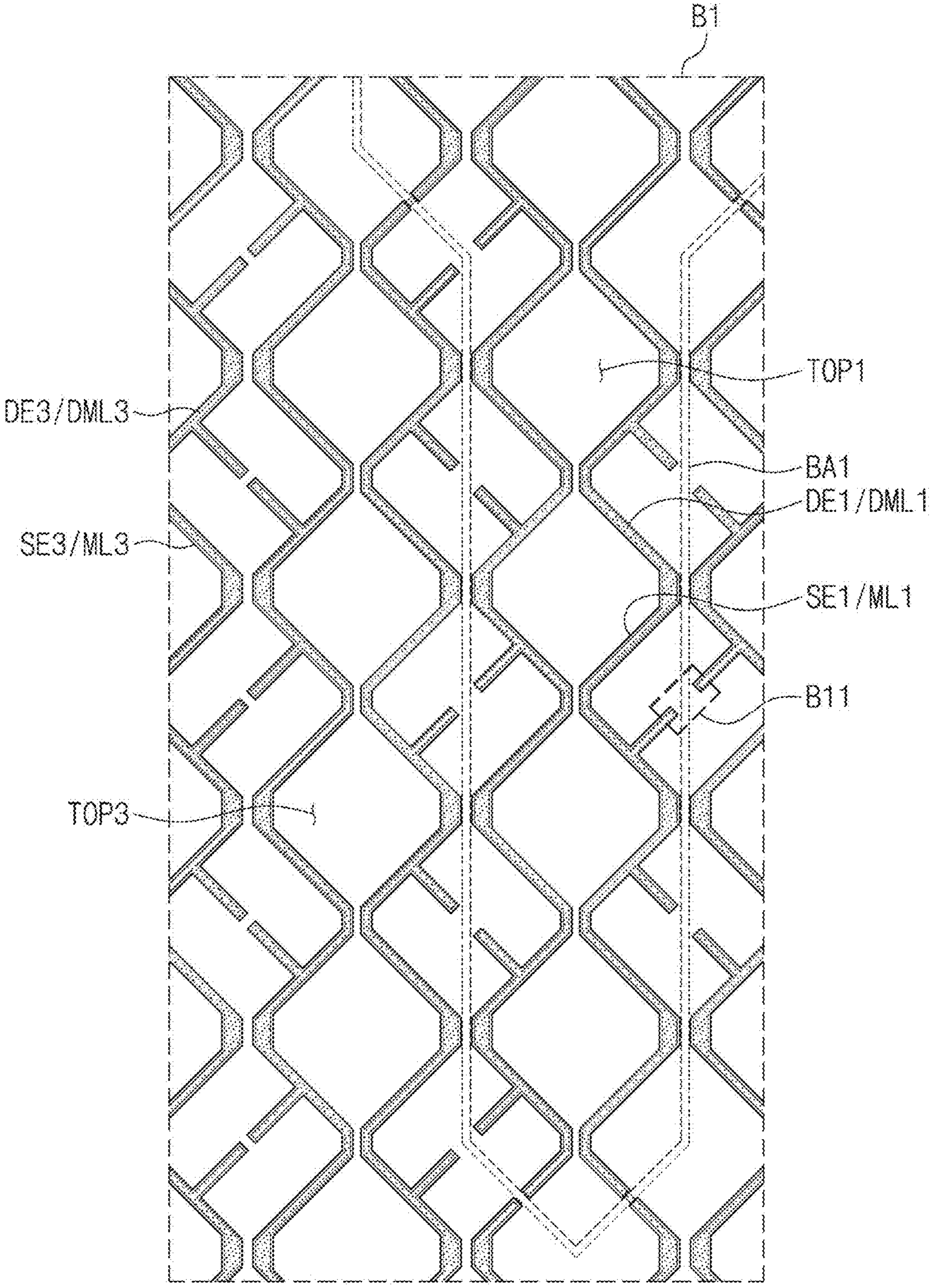
FIG. 10A is an enlarged view of the area B1 in FIG. 9.
Figure 10B:
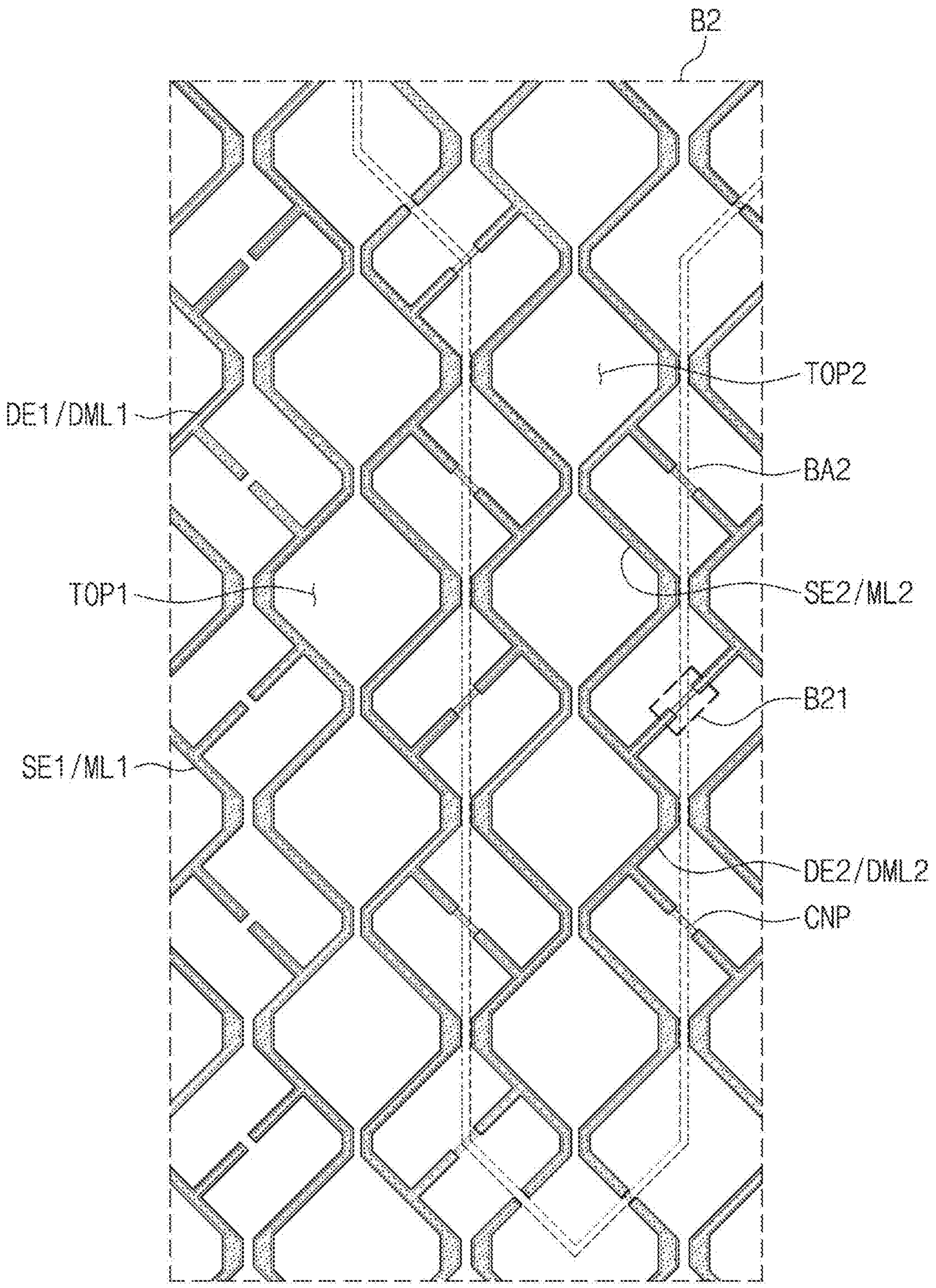
FIG. 10B is an enlarged view of the area B2 in FIG. 9.
Figure 11A:
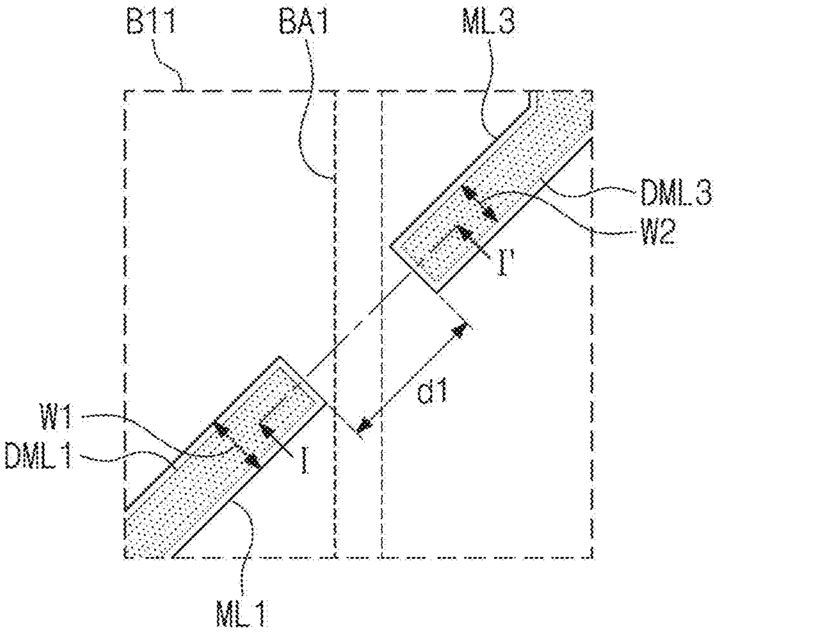
FIG. 11A is an enlarged view of the area B11 in FIG. 10A.
Figure 11B:
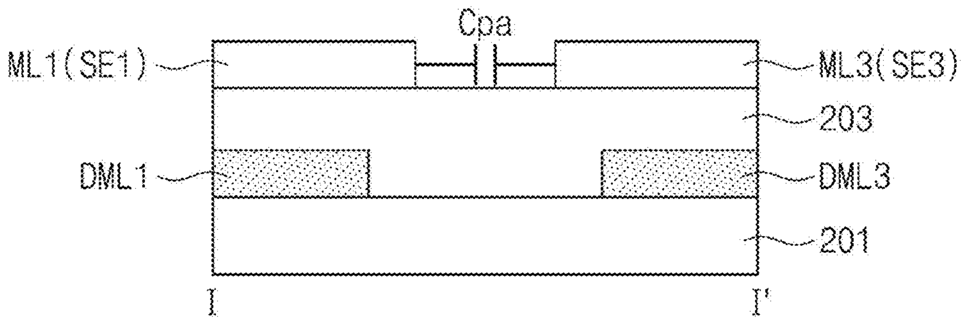
FIG. 11B is a cross-sectional view taken along the line I-I' of FIG. 11A.
Figure 12A:
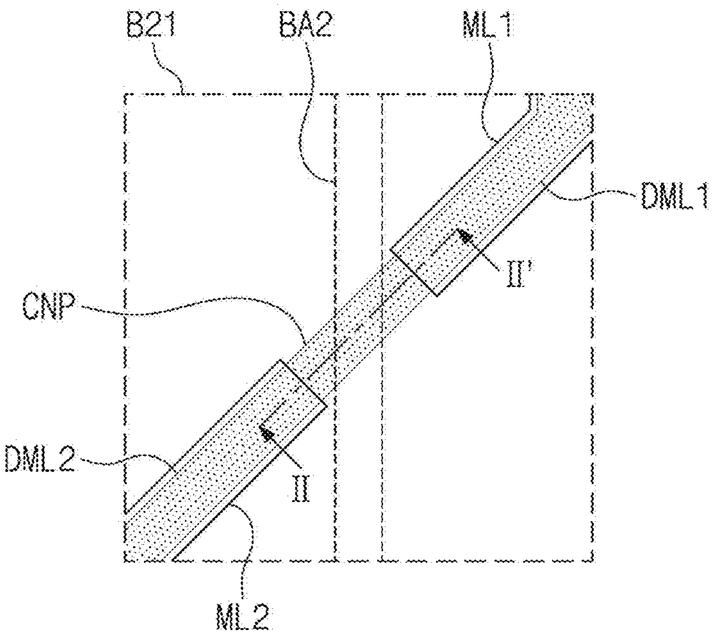
FIG. 12A is an enlarged view of the area B21 in FIG. 10B.
Figure 12B:
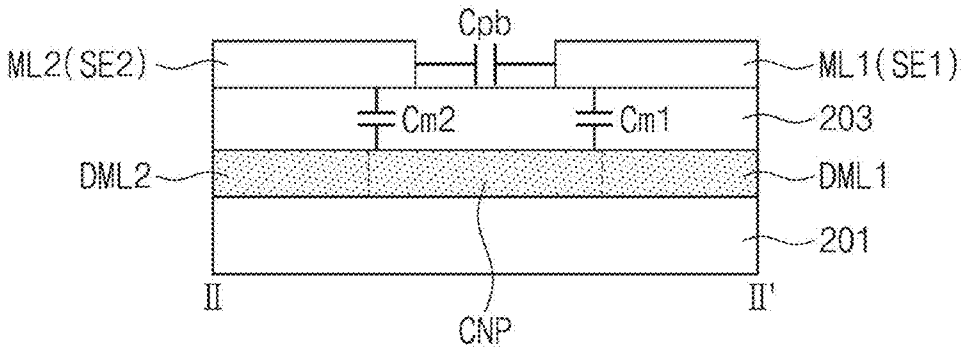
FIG. 12B is a cross-sectional view taken along the line II-II' of FIG. 12A.

FIG. 9 is a plan view illustrating the area A2 illustrated in FIG. 6. FIG. 10A is an enlarged view of the area B1 in FIG. 9, and FIG. 10B is an enlarged view of the area B2 in FIG. 9. FIG. 11A is an enlarged view illustrating the area B111 in FIG. 10A, and FIG. 11B is a cross-sectional view taken along the line I-I' of FIG. 11A. FIG. 12A is an enlarged view illustrating the area B21 in FIG. 10B, and FIG. 12B is a cross-sectional view taken along the line II-II' in FIG. 12A.

Referring to FIG. 9, the sensing electrodes SE (see, e.g., FIG. 6) include a first sensing electrode SE1 and a second sensing electrode SE2 that are disposed adjacent to the hole area ISP_HA. The second sensing electrode SE2 may be adjacent to the first sensing electrode SE1 and may have a smaller extent than that of the first sensing electrode SE1. The first sensing electrode SE1 and the second sensing electrode SE2 are arranged to be spaced apart from each other by a distance (e.g., a specific or predetermined distance). The first sensing electrode SE1 and the second sensing electrode SE2 are electrically separated (or insulated) from each other. A boundary area BA2 may be defined between the first sensing electrode SE1 and the second sensing electrode SE2. The sensing electrodes SE may further include a third sensing electrode SE3 that is adjacent to the first sensing electrode SE1 and has an extent greater than or equal to that of the first sensing electrode SE1. The third sensing electrode SE3 is electrically separated (or insulated) from the first and second sensing electrodes SE1 and SE2. A boundary area BA1 may be defined between the first sensing electrode SE1 and the third sensing electrode SE3.

Each of the sensing electrodes SE may have a mesh shape. The first sensing electrode SE1 includes a first mesh line ML1 that defines a first opening TOP1, and the second sensing electrode SE2 includes a second mesh line ML2 that defines a second opening TOP2. The first mesh line ML1 and the second mesh line ML2 are spaced apart from each other in the boundary area BA2. The third sensing electrode SE3 includes a third mesh line ML3 that defines a third opening TOP3. The first mesh line ML1 and the third mesh line ML3 are spaced apart from each other in the boundary area BA1.

Referring to FIGS. 10A to 11D, the input sensing layer ISP (see, e.g., FIG. 6) further includes a plurality of dummy electrodes that are disposed on a different layer from the sensing electrodes SE and overlap the sensing electrodes SE, respectively. The dummy electrodes include a first dummy electrode DE1 that overlaps the first sensing electrode SE1 and a second dummy electrode DE2 that overlaps the second sensing electrode SE2. The dummy electrodes may further include a third dummy electrode DE3 that overlaps the third sensing electrode SE3. The first and second dummy electrodes DE1 and DE2 are connected to each other in the boundary area BA2 between the first and second sensing electrodes SE1 and SE2. The first and third dummy electrodes DE1 and DE3 are separated (or spaced apart) from each other in the boundary area BA1 between the first and third sensing electrodes SE1 and SE3.

As illustrated in FIGS. 11B and 12B, the first to third dummy electrodes DE1, DE2, and DE3 are disposed on the base insulating layer 201 and are covered by the intermediate insulating layer 203. The first to third sensing electrodes SE1, SE2, and SE3 are disposed on the intermediate insulating layer 203. The first to third sensing electrodes SE1, SE2, and SE3 are electrically insulated from the first to third dummy electrodes DE1, DE2, and DE3 by the intermediate insulating layer 203. The trace lines SNL (see, e.g., FIG. 7) may be disposed on the same layer as the first to third dummy electrodes DE1, DE2, and DE3. For example, the trace lines SNL and the first to third dummy electrodes DE1, DE2, and DE3 are disposed on the base insulating layer 201 and are covered by the intermediate insulating layer 203.

Each of the dummy electrodes may have a mesh shape. The first dummy electrode DE1 includes a first dummy mesh line DML1 that is disposed along the first mesh line ML1, and the second dummy electrode DE2 includes a second dummy mesh line DML2 that is disposed along the second mesh line ML2. The third dummy electrode DE3 includes a third dummy mesh line DML3 that is disposed along the third mesh line ML3. The first to third dummy mesh lines DML1, DML2, and DML3 overlap the first to third mesh lines ML1, ML2, and ML3, respectively. A line width W1 of each of the first to third mesh lines ML1, ML2, and ML3 may be greater than a line width W2 of each of the first to third dummy mesh lines DML1, DML2, and DML3.

The first dummy mesh line DML1 is connected to the second dummy mesh line DML2 in the boundary area BA2 and is separated (or spaced apart) from the third dummy mesh line DML3 in the boundary area BA1. The first dummy mesh line DML1 may have an integral shape with (e.g., may be integrally formed with) the second dummy mesh line DML2, and the connection part CNP that connects the first dummy mesh line DML1 and the second dummy mesh line DML2 may overlap the boundary area BA1.

A first sensing capacitor Cpb is formed between the first sensing electrode SE1 and the second sensing electrode SE2, and a second sensing capacitor Cpa is formed between the first sensing electrode SE1 and the third sensing electrode SE3. Because the second sensing electrode SE2 has a smaller extent than the first and third sensing electrodes SE1 and SE3 due to the hole area ISP_HA, a size of the first sensing capacitor Cpb may be smaller than that of the second sensing capacitor Cpa.

To compensate for the size of the first sensing capacitor Cpb, the first and second dummy electrodes DE1 and DE2 may be connected to each other through the connection part CNP. The connection part CNP and the first and second dummy electrodes DE1 and DE2 may be integrally formed with each other to form one common dummy electrode. Accordingly, a first dummy capacitor Cm1 is formed between the first sensing electrode SE1 and the common dummy electrode, and a second dummy capacitor Cm2 is formed between the second sensing electrode SE2 and the common dummy electrode. A total capacitor formed between the first and second sensing electrodes SE1 and SE2 may be increased by the first and second dummy capacitors Cm1 and Cm2. For example, the total capacitor of the first and second sensing electrodes SE1 and SE2 may have a size that is substantially equal to or similar to that of the second sensing capacitor Cpa. Accordingly, even when the size of the first sensing capacitor Cpb is smaller than the size of the second sensing capacitor Cpa, a sensing performance around the hole area ISP_HA may be prevented from deteriorating.

Figure 13:
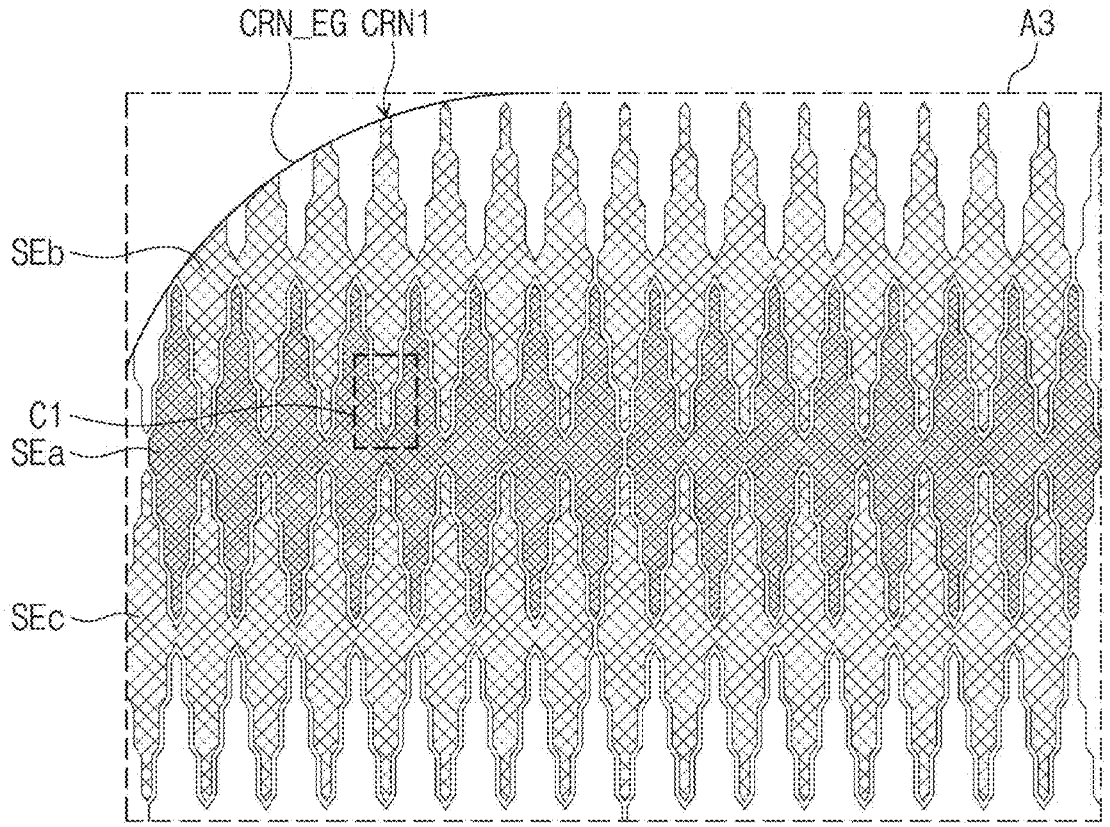
FIG. 13 is a plan view of the area A3 in FIG. 6.
Figure 14A:
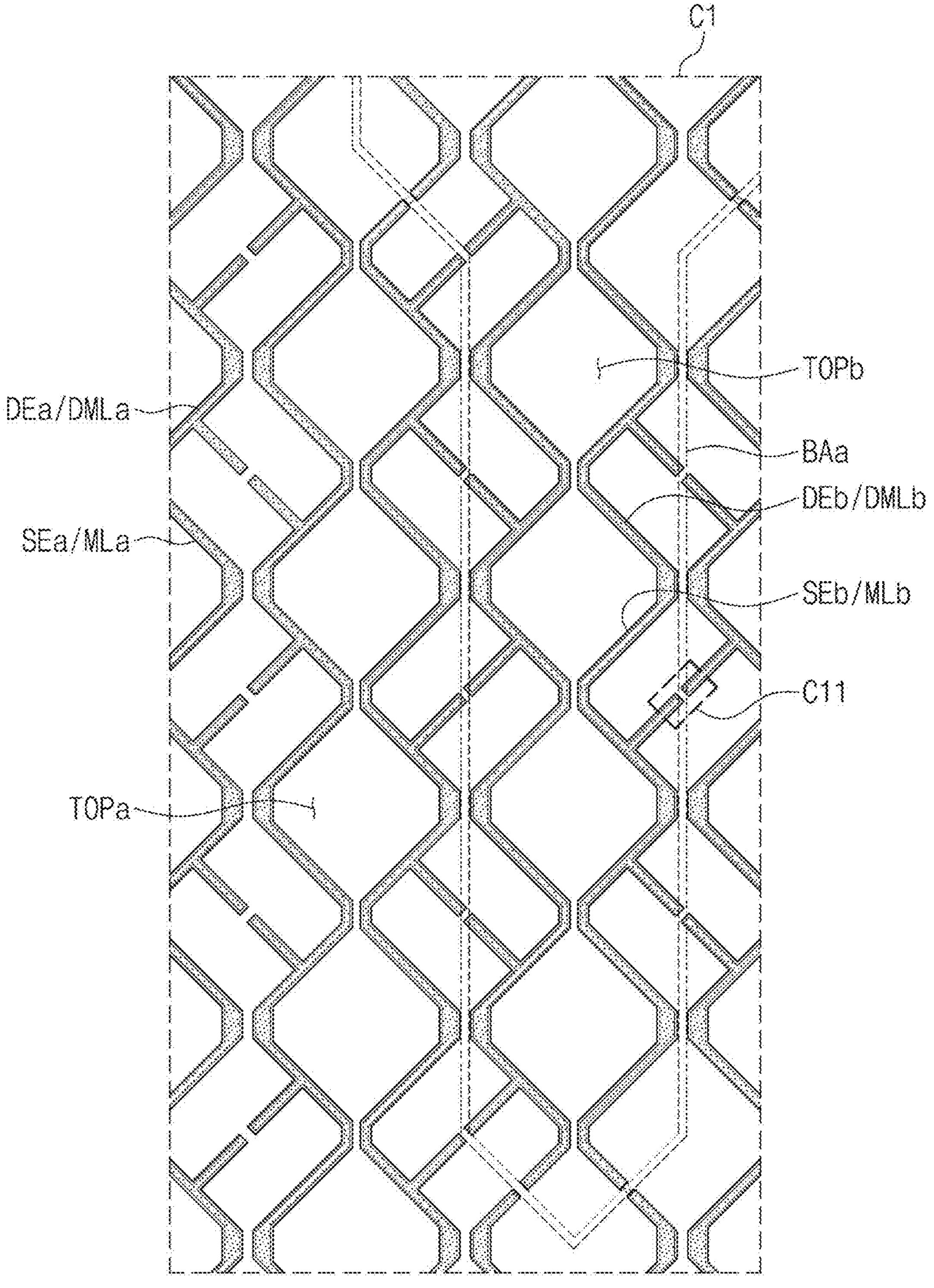
FIG. 14A is an enlarged view of the area C1 in FIG. 13.
Figure 14B:
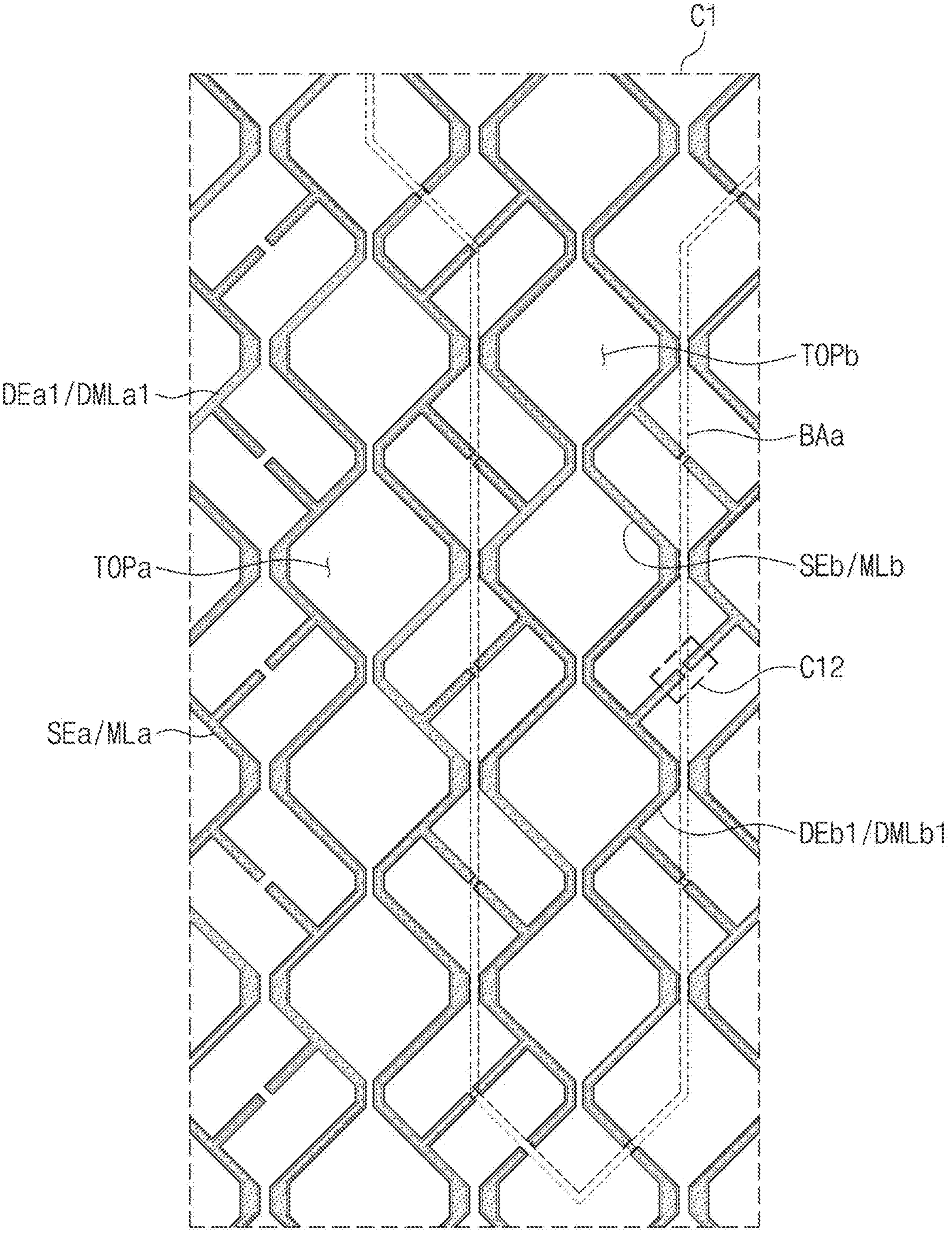
FIG. 14B is an enlarged view of the area C1 according to another embodiment of the present disclosure.
Figure 15A:
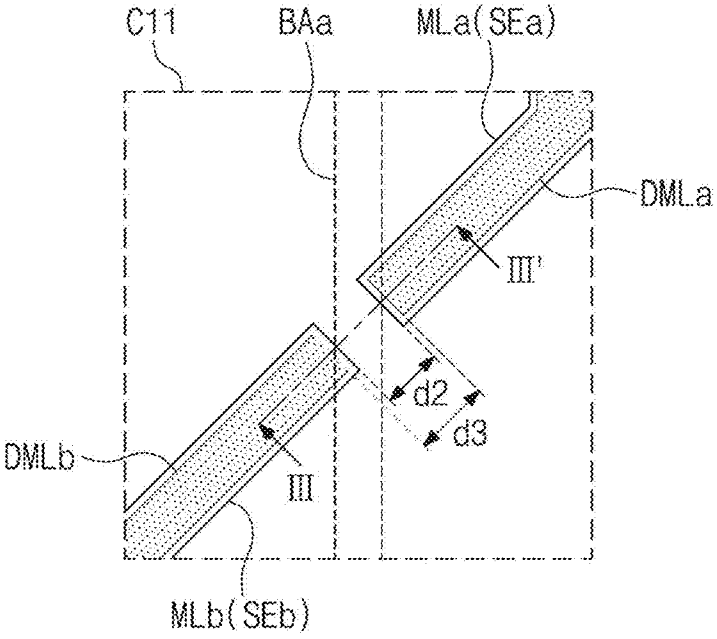
FIG. 15A is an enlarged view of the area C11 in FIG. 14A.
Figure 15B:
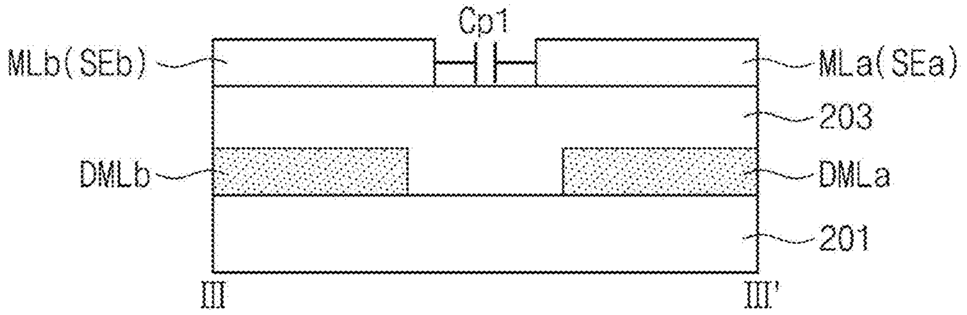
FIG. 15B is a cross-sectional view taken along the line III-III' of FIG. 15A.
Figure 16A:
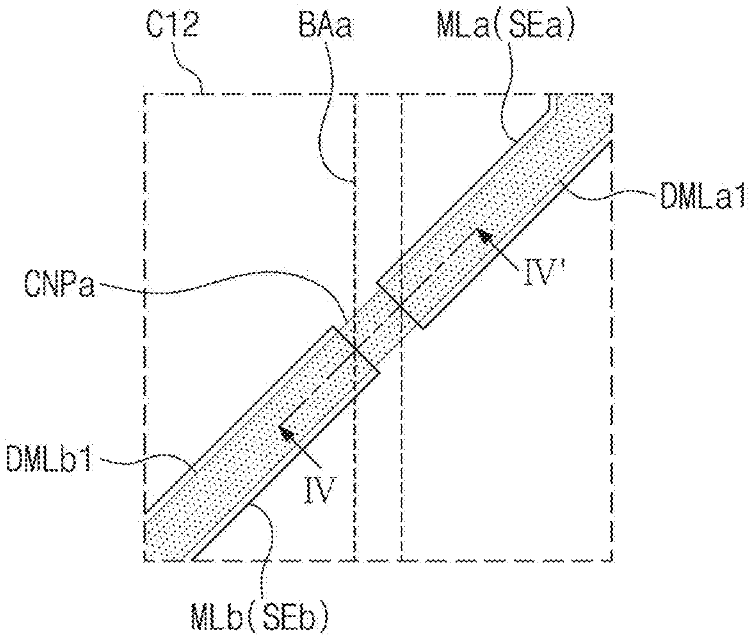
FIG. 16A is an enlarged view of the area C12 in FIG. 14B.
Figure 16B:
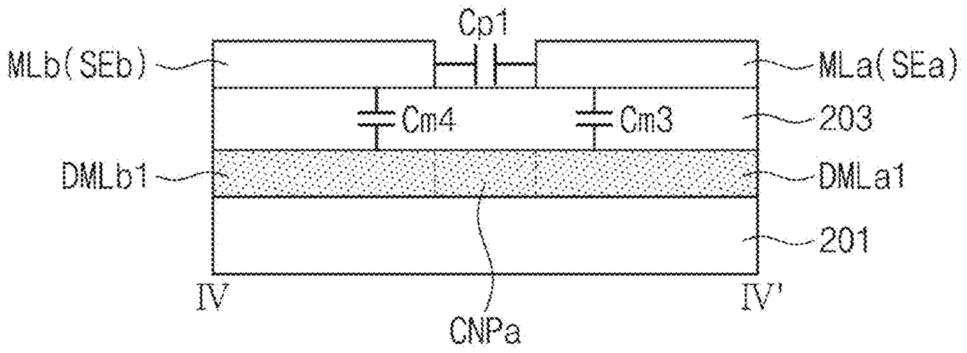
FIG. 16B is a cross-sectional view taken along the line IV-IV' of FIG. 16A.

FIG. 13 is a plan view illustrating area A3 illustrated in FIG. 6. FIG. 14A is an enlarged view of the area C1 in FIG. 13, and FIG. 14B is an enlarged view of the area C1 according to another embodiment of the present disclosure. FIG. 15A is an enlarged view illustrating the area C11 in FIG. 14A, and FIG. 15B is a cross-sectional view taken along the line III-III' in FIG. 15A. FIG. 16A is an enlarged view illustrating the area C12 in FIG. 14B, and FIG. 16B is a cross-sectional view taken along the line IV-IV' in FIG. 16A.

Referring to FIGS. 13, 14A, 15A, and 15B, the sensing electrodes SE (see, e.g., FIG. 6) include a first sensing electrode SEa and a second sensing electrode SEb that are disposed adjacent to the corner part (e.g., the first corner part CRN1). The second sensing electrode SEb may be adjacent to the first sensing electrode SEa and may have a smaller extent than that of the first sensing electrode SEa. The first sensing electrode SEa and the second sensing electrode SEb are disposed to be spaced apart from each other by a distance (e.g., a specific or predetermined distance). A boundary area BAa may be defined between the first sensing electrode SEa and the second sensing electrode SEb. The sensing electrodes SE may further include a third sensing electrode SEc that is adjacent to the first sensing electrode SEa and has an extent that is greater than or equal to that of the first sensing electrode SEa. A boundary area may be defined between the first sensing electrode SEa and the third sensing electrode SEc.

The disposition structure of the first sensing electrode SEa and the third sensing electrode SEc is the same as the disposition structure of the first sensing electrode SE1 and the third sensing electrode SE3 illustrated in FIGS. 10A, 11A, and B, and thus, a detailed description of the disposition structure of the first sensing electrode SEa and the third sensing electrode SEc is omitted.

In the boundary area BA1 between the first sensing electrode SEa and SE1 and the third sensing electrode SEc (or SE3 (see, e.g., FIG. 10A)), the first sensing electrode SEa and SE1 and the third sensing electrode SEc (or SE3 (see, e.g., FIG. 10A)) are spaced apart from each other by the first distance d1 (see, e.g., FIG. 11A). In the boundary area BAa between the first sensing electrode SEa and the second sensing electrode SEb, the first sensing electrode SEa and the second sensing electrode SEb are spaced apart from each other by a second distance d2. According to an embodiment of the present disclosure, the second distance d2 may be smaller than the first distance d1.

Each of the sensing electrodes SE may have a mesh shape. The first sensing electrode SEa includes a first mesh line MLa that defines a first opening TOPa, and the second sensing electrode SEb includes a second mesh line TOPb that defines a second opening MLb. The first mesh line MLa and the second mesh line MLb are spaced apart from each other in the boundary area BAa by the second distance d2. The third sensing electrode SEc (or SE3) includes the third mesh line ML3 (see, e.g., FIG. 10A) that defines the third opening TOP3. The first mesh line ML1 and the third mesh line ML3 are spaced apart from each other by the first distance d1 (see, e.g., FIG. 11A) in the boundary area BA1.

Referring to FIGS. 14A, 15A, and 15B, the input sensing layer ISP (see, e.g., FIG. 6) further includes a plurality of dummy electrodes that are disposed on a different layer from the sensing electrodes SE and overlap the sensing electrodes SE, respectively. The dummy electrodes include a first dummy electrode DEa that overlaps the first sensing electrode SEa and a second dummy electrode DEb that overlaps the second sensing electrode SEb. The first and second dummy electrodes DEa and DEb may be separated from each other in the boundary area BAa between the first and second sensing electrodes SEa and SEb.

Each of the dummy electrodes may have a mesh shape. The first dummy electrode DEa includes a first dummy mesh line DMLa that is disposed along a first mesh line MLa, and the second dummy electrode DEb includes a second dummy electrode DMLb that is disposed along a second mesh line MLb. The first dummy mesh line DMLa may be separated from the second dummy mesh line DMLb in the boundary area BAa. According to an embodiment of the present disclosure, the first dummy mesh line DMLa and the second dummy mesh line DMLb are spaced apart from each other by a third distance d3 in the boundary area BAa. The third distance d3 may be greater than the second distance d2.

The second sensing electrode SEb may have a smaller extent than that of the first sensing electrode SEa due to the curved edge CRN_EG in the first corner part CRN1. However, when the second distance d2 between the first sensing electrode SEa and the second sensing electrode SEb is set to be smaller than the first distance d1, the size of the first sensing capacitor Cp1 may be prevented (or improved) from being smaller than that of the second sensing capacitor Cpa (see, e.g., FIG. 11B). Accordingly, even when the second sensing electrode SEb has a smaller extent than that of the first sensing electrode SEa around the first corner part CRN1, a sensing performance in the first corner part CRN1 may be prevented from deteriorating.

Referring to FIGS. 14B, 16A, and 16B, the input sensing layer ISP (see, e.g., FIG. 6) further includes a plurality of dummy electrodes that are disposed on a different layer from the sensing electrodes SE and overlap the sensing electrodes SE, respectively. The dummy electrodes include a first dummy electrode DEa1 that overlaps the first sensing electrode SEa and a second dummy electrode DEb1 that overlaps the second sensing electrode SEb. The first and second dummy electrodes DEa1 and DEb1 may be connected to each other in the boundary area BAa between the first and second sensing electrodes SEa and SEb.

As illustrated in FIG. 16B, the first and second dummy electrodes DEa1 and DEb1 are disposed on the base insulating layer 201 and are covered by the intermediate insulating layer 203. The first to third sensing electrodes SEa and SEb are disposed on the intermediate insulating layer 203.

Each of the dummy electrodes may have a mesh shape. The first dummy electrode DEa1 includes a first dummy mesh line DMLa1 that is disposed along the first mesh line MLa, and the second dummy electrode DEb1 includes a second dummy electrode DMLb1 that disposed along the second mesh line MLb. The first dummy mesh line DMLa1 is connected to the second dummy mesh line DMLb1 in the boundary area BAa. The first dummy mesh line DMLa1 may have an integral shape with (e.g., may be integrally formed with) the second dummy mesh line DMLb1, and the connection part CNP that connects the first dummy mesh line DMLa1 and the second dummy mesh line DMLb1 may overlap the boundary area BAa.

The first sensing capacitor Cp1 is formed between the first sensing electrode SEa and the second sensing electrode SEb. The size of the first sensing capacitor Cp1 may be compensated by adjusting the distance between the first sensing electrode SEa and the second sensing electrode SEb, but the size of the first sensing capacitor Cp1 may not reach a desired size only by adjusting the distance. In this case, the first and second dummy electrodes DEa1 and DEb1 may be connected to each other through a connection part CNPa. The connection part CNPa and the first and second dummy electrodes DEa1 and DEb2 may be integrally formed with each other to form one common dummy electrode. Accordingly, a first dummy capacitor Cm3 is formed between the first sensing electrode SEa and the common dummy electrode, and a second dummy capacitor Cm4 is formed between the second sensing electrode SEb and the common dummy electrode. A total capacitor formed between the first and second sensing electrodes SEa and SEb may be increased by the first and second dummy capacitors Cm3 and Cm4. For example, the total capacitor of the first and second sensing electrodes SEa and SEb may have a size that is substantially the same as or similar to that of the second sensing capacitor Cpa (see, e.g., FIG. 11B). Accordingly, even when the size of the first sensing capacitor Cp1 is smaller than the size of the second sensing capacitor Cpa, a sensing performance around the corner part CRN1 may be prevented from deteriorating.

As described above, the second sensing electrode disposed adjacent to the hole area and the corner part may be formed to have a smaller extent than that of the first sensing electrode due to the space constraints. In such an embodiment, the connection part that connects the dummy electrodes may be formed in the boundary area between the first and second sensing electrodes, or the distance between the first and second sensing electrodes in the boundary area may be reduced. Accordingly, a sensing performance in the hole area and the corner parts that may occur due to a decrease in the extent of the second sensing electrode may be prevented from deteriorating, and as a result, the display device may have uniform sensing performance in the entire area.

Although the present disclosure has been described with reference to embodiments, it will be appreciated by one of ordinary skill in the art to which the present disclosure pertains that the present disclosure may be modified and changed within the scope of the appended claims and their equivalents without departing from the spirits and technical field of the present disclosure. Therefore, the technical scope of the present disclosure should not be limited to the detailed description of the specification but should be determined by the claims and their equivalents.

What is claimed is:

1. A display device comprising:

a display panel; and an input sensing layer on the display panel, the input sensing layer comprises:

a plurality of sensing electrodes; and a plurality of dummy electrodes on a layer different from the plurality of sensing electrodes and overlapping the plurality of sensing electrodes, wherein the plurality of sensing electrodes comprises:

a first sensing electrode; and a second sensing electrode adjacent to the first sensing electrode, electrically separated from the first sensing electrode, and having a smaller extent than that of the first sensing electrode, wherein the plurality of dummy electrodes comprises:

a first dummy electrode overlapping the first sensing electrode; and a second dummy electrode overlapping the second sensing electrode, wherein the first and second dummy electrodes are connected at a boundary area between the first and second sensing electrodes, wherein the first dummy electrode comprises a first dummy mesh line and the second dummy electrode comprises a second dummy mesh line, and wherein the first dummy mesh line has an integral shape with the second dummy mesh line.

2. The display device of claim 1, wherein the first sensing electrode comprises a first mesh line defining a first opening, wherein the second sensing electrode comprises a second mesh line defining a second opening, and wherein the first mesh line and the second mesh line are spaced apart from each other in the boundary area.

3. The display device of claim 2, wherein the first dummy mesh line extends along the first mesh line, wherein the second dummy mesh line extends along the second mesh line, and wherein the first dummy mesh line is connected to the second dummy mesh line in the boundary area.

4. The display device of claim 3, wherein a line width of each of the first and second mesh lines is greater than a line width of each of the first and second dummy mesh lines.

5. The display device of claim 1, wherein the input sensing layer further comprises:

a base insulating layer on which the plurality of dummy electrodes are arranged; and an intermediate insulating layer covering the plurality of dummy electrodes and on which the plurality of sensing electrodes are arranged.

6. The display device of claim 1, wherein the plurality of sensing electrodes are arranged in a first direction and a second direction crossing the first direction, and wherein the plurality of sensing electrodes are electrically separated from each other.

7. The display device of claim 1, wherein the input sensing layer has an active area in which a hole area is defined and an inactive area around the active area, wherein the plurality of sensing electrodes are in the active area, and wherein the first and second sensing electrodes are adjacent to the hole area.

8. The display device of claim 1, wherein the input sensing layer has an active area having a curved edge at a portion of the input sensing layer and an inactive area around the active area, and wherein the first and second sensing electrodes are adjacent to the curved edge.

9. The display device of claim 1, wherein the plurality of sensing electrodes further comprises:

a third sensing electrode adjacent to the first sensing electrode and having an extent that is equal to or greater than that of the first sensing electrode, wherein the first and third sensing electrodes are spaced apart from each other by a first distance in a boundary area between the first and third sensing electrodes, and wherein the first and second sensing electrodes are spaced apart from each other by a second distance that is smaller than the first distance in the boundary area between the first and second sensing electrodes.

10. The display device of claim 1, wherein the dummy electrodes are electrically floated.

11. The display device of claim 1, further comprising a sensor controller configured to drive the input sensing layer, wherein the input sensing layer comprises a plurality of trace lines electrically connecting the plurality of sensing electrodes to the sensor controller.

12. The display device of claim 11, wherein each of the trace lines is connected to a corresponding one of the plurality of sensing electrodes and overlaps at least one non-corresponding sensing electrode of the plurality of sensing electrodes that does not correspond thereto.

13. The display device of claim 11, wherein the trace lines and the plurality of dummy electrodes are on the same layer, and wherein the plurality of dummy electrodes do not overlap the trace lines.

14. An electronic device comprising a display device, the display device comprising:

a display panel; and an input sensing layer on the display panel, the input sensing layer comprising:

a plurality of sensing electrodes; and a plurality of dummy electrodes on a layer different from the plurality of sensing electrodes and overlapping the plurality of sensing electrodes, wherein the plurality of sensing electrodes comprises:

a first sensing electrode; and a second sensing electrode adjacent to the first sensing electrode, electrically separated from the first sensing electrode, and having a smaller extent than that of the first sensing electrode, wherein the plurality of dummy electrodes comprises:

a first dummy electrode overlapping the first sensing electrode; and a second dummy electrode overlapping the second sensing electrode, wherein the first and second dummy electrodes are connected at a boundary area between the first and second sensing electrodes, wherein the first dummy electrode comprises a first dummy mesh line and the second dummy electrode comprises a second dummy mesh line, and wherein the first dummy mesh line has an integral shape with the second dummy mesh line.

* * * * *